United States Patent
Yoshimoto et al.

(10) Patent No.: US 7,055,752 B2
(45) Date of Patent: Jun. 6, 2006

(54) IC CARD

(75) Inventors: Tetsuro Yoshimoto, Kadoma (JP); Joji Katsura, Nishinomiya (JP); Shota Nakashima, Hirakata (JP); Takeshi Yamamoto, Hirataka (JP); Miki Mizushima, Toyonaka (JP); Rie Ito, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/030,252

(22) PCT Filed: May 21, 2001

(86) PCT No.: PCT/JP01/04213

§ 371 (c)(1),
(2), (4) Date: Jan. 9, 2002

(87) PCT Pub. No.: WO01/91046

PCT Pub. Date: Nov. 29, 2001

(65) Prior Publication Data

US 2002/0104890 A1 Aug. 8, 2002

(30) Foreign Application Priority Data

May 22, 2000 (JP) .............................. 2000-149759

(51) Int. Cl.
*G06K 19/06* (2006.01)
(52) U.S. Cl. ...................................... 235/492; 235/487
(58) Field of Classification Search ................ 235/492; 340/825, 455, 370; 713/322, 323; 365/229
See application file for complete search history.

(56) References Cited

U.S. PATENT DOCUMENTS

| | | | | |
|---|---|---|---|---|
| 4,315,330 A | * | 2/1982 | Brickman et al. .......... | 370/241 |
| 4,575,621 A | * | 3/1986 | Dreifus ....................... | 235/380 |
| 4,625,241 A | * | 11/1986 | Ohzeki ........................ | 348/464 |
| 4,814,595 A | * | 3/1989 | Gilboa ......................... | 235/492 |
| 4,918,416 A | * | 4/1990 | Walton et al. ............... | 235/493 |
| 4,924,075 A | * | 5/1990 | Tanaka ........................ | 235/380 |
| 4,962,485 A | * | 10/1990 | Kato et al. .................. | 365/229 |
| 5,101,410 A | * | 3/1992 | Niimura et al. .............. | 714/45 |
| 5,129,091 A | * | 7/1992 | Yorimoto et al. ........... | 713/323 |
| 5,179,661 A | * | 1/1993 | Copeland et al. ............ | 710/29 |
| 5,365,047 A | * | 11/1994 | Yamaguchi ................. | 235/380 |
| 5,382,778 A | * | 1/1995 | Takahira et al. ............ | 235/380 |
| 5,410,714 A | * | 4/1995 | Yorimoto et al. ........... | 713/323 |
| 5,477,215 A | * | 12/1995 | Mandelbaum ............. | 340/5.61 |

(Continued)

FOREIGN PATENT DOCUMENTS

JP 56096303 A * 8/1981

(Continued)

*Primary Examiner*—Thien M. Le
*Assistant Examiner*—Kumiko C. Koyama
(74) *Attorney, Agent, or Firm*—McDermott Will & Emery LLP

(57) ABSTRACT

A state control circuit gives an inactive state control signal to a CPU and an active state control signal to a data transmission circuit. In response to this, the CPU goes into the halt state and the data transmission circuit goes into the receive state. When receive processing is completed, the state control circuit gives an active state control signal to the CPU. In response to this, the CPU restores from the halt state to the operative state. The CPU gives an instruction signal to the state control circuit. The state control circuit gives an inactive state control signal to the data transmission circuit. In response to this, the data transmission circuit goes into the halt state.

19 Claims, 19 Drawing Sheets

U.S. PATENT DOCUMENTS

| | | | |
|---|---|---|---|
| 5,500,650 A * | 3/1996 | Snodgrass et al. | 342/42 |
| 5,670,772 A * | 9/1997 | Goto | 235/493 |
| 5,729,004 A * | 3/1998 | Kim et al. | 235/492 |
| 5,787,101 A * | 7/1998 | Kelly | 714/800 |
| 5,845,134 A * | 12/1998 | Arai | 713/322 |
| 5,875,480 A | 2/1999 | Le Roux et al. | |
| 5,959,276 A * | 9/1999 | Iijima | 235/380 |
| 5,968,166 A * | 10/1999 | Kakiage et al. | 712/225 |
| 6,036,100 A * | 3/2000 | Asami | 235/492 |
| 6,045,042 A * | 4/2000 | Ohno | 235/440 |
| 6,061,357 A * | 5/2000 | Olshansky et al. | 370/401 |
| 6,079,622 A * | 6/2000 | Goto | 235/492 |
| 6,161,762 A * | 12/2000 | Bashan et al. | 235/492 |
| 6,266,810 B1 * | 7/2001 | Tanaka et al. | 717/173 |
| 6,434,161 B1 * | 8/2002 | Higbee et al. | 370/413 |
| 6,563,618 B1 * | 5/2003 | Morrow et al. | 398/135 |
| 6,615,167 B1 * | 9/2003 | Devins et al. | 703/28 |
| 6,625,683 B1 * | 9/2003 | Khan et al. | 710/313 |
| 6,728,812 B1 * | 4/2004 | Kato | 710/303 |

FOREIGN PATENT DOCUMENTS

| | | |
|---|---|---|
| JP | 59-151274 | 8/1984 |
| JP | 61-283979 | 12/1986 |
| JP | 02-048757 | 2/1990 |
| JP | 02-232793 | 9/1990 |
| JP | 04-005783 | 1/1992 |
| JP | 04-127290 | 4/1992 |
| JP | 04115614 A * | 4/1992 |
| JP | 04-153793 | 5/1992 |
| JP | 04-241082 | 8/1992 |
| JP | 06-149686 | 5/1994 |
| JP | 8-167014 | 6/1996 |
| JP | 10-105659 | 4/1998 |
| JP | 11-194996 | 7/1999 |
| JP | 2000-172805 A | 6/2000 |

* cited by examiner

IC CARD

TECHNICAL FIELD

The present invention relates to an IC card, and more particularly, it relates to a contactless IC card that sends/receives data to/from the outside and is supplied with power from the outside in a contactless manner.

BACKGROUND ART

Recently, commercialization of an IC card system has been actively proceeded in various industries in Japan. For example, in the telephone industry, IC telephone cards have already been on sale and public telephones complying with IC cards have already been installed. Also, in the railway industry, an IC commutation ticket system is scheduled to be put in practical use in a few years. Furthermore, introduction of IC cards as substitution for identification cards such as a license and a health insurance card is under examination.

IC cards are classified into contact cards and contactless cards. In a contact IC card, an external terminal is brought into contact with a reader/writer so as to send/receive data and be supplied with power. In contrast, in a contactless IC card, data are sent to and received from a reader/writer and power is supplied from a reader/writer in a contactless manner by using a self-contained antenna. Furthermore, contactless IC cards under development in various companies are to comply with the anti-collision function of ISO 14443-3 for allowing one reader/writer to simultaneously write/read data in/from a plurality of IC cards. Owing to this anti-collision function, an effect that, for example, exchange of information on medical examination results and payment for the examination can be simultaneously completed by simultaneously subjecting a contactless IC card for hospital use and a contactless IC card for financial use to a reader/writer can be expected.

In a contactless IC card, since power is supplied through radio connection, the power supply is less stable than in a contact IC card. Therefore, in receiving a data from a reader/writer to store it in a self-contained nonvolatile memory or in reading a data from the nonvolatile memory to send it to a reader/writer, the data may not be normally received/sent due to the influence of noise caused by the operation of the nonvolatile memory. Furthermore, also in the case where one reader/writer simultaneously writes/reads data in/from a plurality of IC cards, data transmission of one IC card may not be normally conducted because of the influence of noise caused in another contactless IC card in storing a received data in the nonvolatile memory or sending a data read from a nonvolatile memory to the reader/writer.

DISCLOSURE OF THE INVENTION

An object of the invention is providing an IC card capable of suppressing the influence of noise caused by the operation of a nonvolatile memory.

According to the invention, the IC card of this invention is a contactless IC card that sends/receives data to/from the outside and is supplied with power from the outside in a contactless manner and includes a transmission circuit, a buffer memory, a DMA circuit, a nonvolatile memory, a CPU and state control means. The transmission circuit sends/receives data to/from the outside. The DMA circuit transmits a data received by the transmission circuit to the buffer memory and transmits a data stored in the buffer memory to the transmission circuit. The CPU writes/reads data in/from the buffer memory and the nonvolatile memory. The state control circuit halts the operations of the nonvolatile memory and the CPU while the transmission circuit is sending/receiving data to/from the outside.

In the IC card, the nonvolatile memory and the CPU halt their operations while the transmission circuit is sending/receiving data to/from the outside. Therefore, the influence on the transmission circuit of noise caused by the operations of the nonvolatile memory and the CPU can be suppressed. As a result, the reliability in send/receive processing by the transmission circuit can be improved. Furthermore, also in the case where one reader/writer reads/writes data in/from a plurality of IC cards, the nonvolatile memories and the CPUs of the respective IC cards halt their operations while the transmission circuits of the respective IC cards are sending/receiving data to/from the outside. Therefore, mutual interference by noise caused in the respective IC cards can be avoided, so as to improve the reliability in the send/receive processing of the plural IC cards.

Preferably, a data bit appears every predetermined period in data sent/received by the transmission circuit. Also, the transmission circuit generates an interruption signal at timing between a period for sending/receiving one data bit and a period for sending/receiving another data bit. The DMA circuit executes transmission processing in response to the interruption signal.

In the IC card, the DMA circuit executes the transmission processing at timing between a period when one data bit is sent/received by the transmission circuit and a period when another data bit is sent/received. Therefore, data sent/received by the transmission circuit can be prevented from being changed due to the influence of noise caused by the operation of the DMA circuit.

Preferably, a data received by the transmission circuit has a structure in accordance with the standard of ISO/IEC 14443-3, and the transmission circuit includes normal waveform storing means, possible error waveform storing means, waveform detecting means and collating means.

The normal waveform storing means stores a waveform pattern standardized by ISO/IEC 14443-3. The possible error waveform storing means stores a waveform pattern including a possible error predicted with respect to a data received by the transmission circuit. The waveform detecting means detects a waveform pattern of a data received by the transmission circuit. The collating means corrects the data received by the transmission circuit on the basis of the normal waveform pattern when the waveform pattern detected by the waveform detecting means accords with the waveform pattern stored in the normal waveform storing means or the waveform pattern stored in the possible error waveform storing means.

In the IC card, when a data received by the transmission circuit includes an error, the error can be corrected.

Preferably, a data received by the transmission circuit has a structure in accordance with the standard of ISO/IEC 14443-3, and the transmission circuit includes an analog circuit part. The analog circuit part modulates a data received from the outside into a digital data and outputs the digital data. The IC card further includes preset signal generation means. The preset signal generation means gives the analog circuit part a preset signal that is active during a period other than a period when the transmission circuit is receiving a data. The analog circuit part sets an output thereof to a logical high level in response to the active preset signal.

In the IC card, even though the signal output by the analog circuit part falls to a logical low level in a period other than the period when the transmission circuit is receiving a data, the transmission circuit can be prevented from going into the receive state with the signal output by the analog circuit part at the logical low level.

Preferably, a data received by the transmission circuit has a structure in accordance with the standard of ISO/IEC 14443-3, and the transmission circuit includes an analog circuit part. The analog circuit part modulates a data received from the outside into a digital data and outputs the digital data. The IC card further includes hold signal generation means. The hold signal generation means gives the analog circuit part a hold signal that is active during a period other than a period when the transmission circuit is receiving a data. The analog circuit part sets, in response to the active hold signal, an output thereof to a logical high level during a period other than the period when the transmission circuit is receiving a data.

In the IC card, the hold signal generation means gives the analog circuit part a hold signal that is active during a period other than a period when the transmission circuit is receiving a data. In response to this active hold signal, the analog circuit part sets its output to a logical high level. Therefore, the transmission circuit can be prevented from going into the receive state with the signal output by the analog circuit part at a logical low level.

Preferably, the IC card further includes a resume circuit. When data write processing on the nonvolatile memory executed by the CPU is interrupted, the resume circuit stores a proceeding state of the write processing up to time of interruption. The CPU resumes the write processing on the nonvolatile memory on the basis of the proceeding state stored in the resume circuit.

In the IC card, even when the write processing on the nonvolatile memory is interrupted, the write processing can be resumed from the state attained at time of the interruption.

Preferably, the state control circuit includes a time counting circuit. The time counting circuit starts counting time in response to the CPU going into a halt state, stops counting the time in response to restoration of the CPU to an operative state and outputs a counted value to the CPU.

When the CPU restores from the halt state to the operative state, it should be informed of time during which it was in the halt state. If an accessory timer of the CPU is used for informing the time during which it was in the halt state, the CPU is operated at time intervals even when the transmission circuit is sending/receiving data. Noise can be caused by this operation of the CPU, and the noise can affect the data transmission circuit.

In the IC card, the CPU can be completely placed in the halt state while the transmission circuit is sending/receiving data owing to the time counting circuit. Therefore, the CPU can be informed of the time during which it was in the halt state without causing noise by the operation of the CPU.

Preferably, the IC card further includes a time monitoring circuit. The time monitoring circuit starts counting time in response to the CPU going into a halt state and outputs a timeout signal to the CPU when the CPU does not restore to an operative state before a counted value reaches a given value. The CPU goes into the operative state in response to the timeout signal output by the time monitoring circuit.

In the IC card, the CPU can be prevented from being kept in the halt state owing to the time monitoring circuit.

BEST MODE FOR CARRYING OUT THE INVENTION

Figure 1:
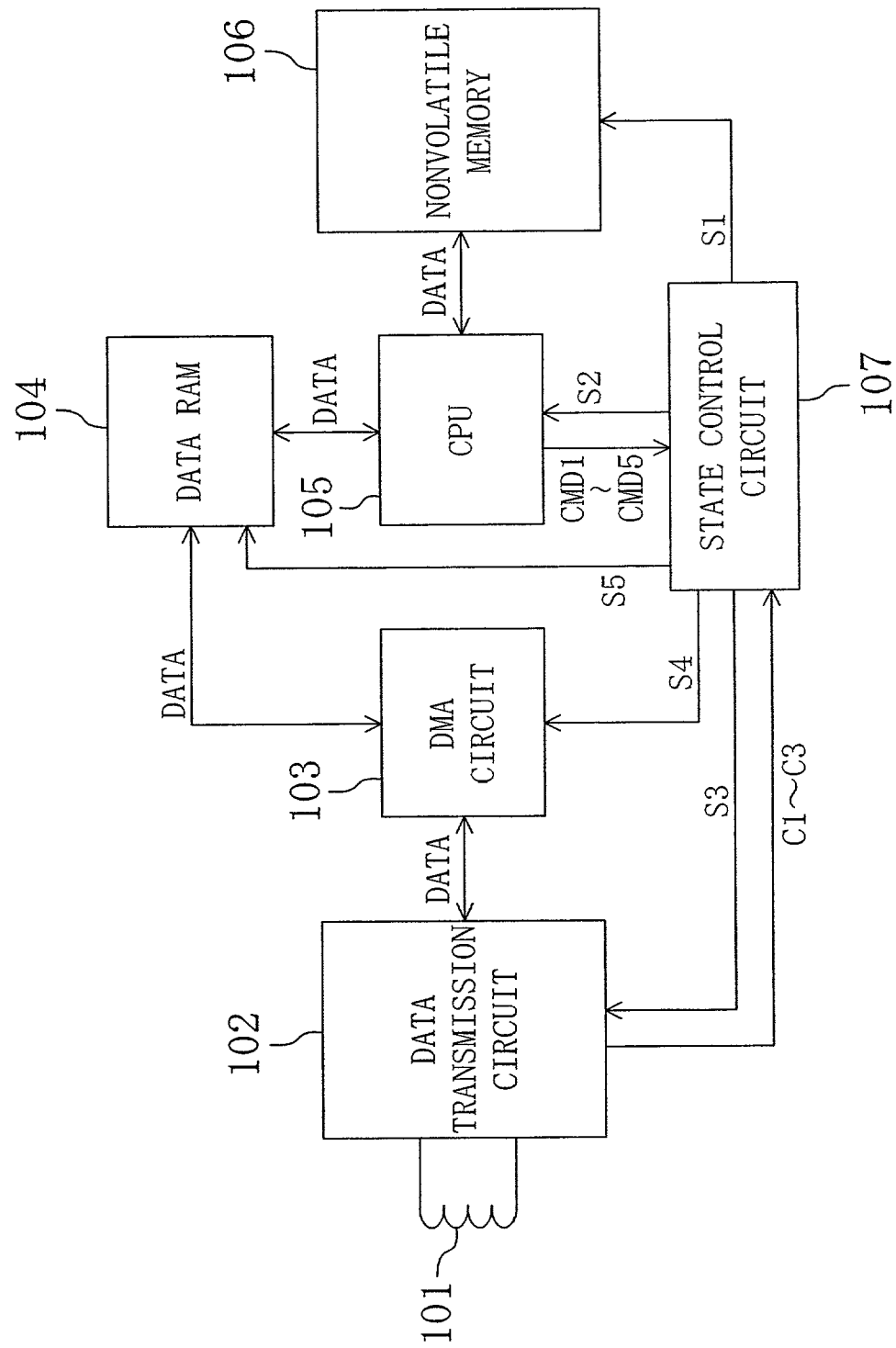
FIG. 1 is a block diagram for showing the configuration of an IC card according to Embodiment 1 of the invention.

Preferred embodiments of the invention will now be described in detail with reference to the accompanying drawings. In the drawings, like reference numerals are used to refer to like or corresponding elements so as to avoid repeating the description.

Embodiment 1

<Configuration>

FIG. 1 is a block diagram for showing the configuration of an IC card according to Embodiment 1 of the invention. Referring to FIG. 1, the IC card includes an antenna 101, a data transmission circuit 102, a DMA circuit 103, a data RAM 104, a CPU 105, a nonvolatile memory 106 and a state control circuit 107.

The antenna 101 receives a signal sent from a reader/writer (not shown) and sends a signal to the reader/writer. This sending/receiving is carried out in a contactless manner by using electric waves as a medium. Also, the antenna 101 receives power from the reader/writer by using electromagnetic waves as a medium. This power serves as the operation power of the IC card.

The data transmission circuit 102 processes a signal received by the antenna 101 and transmits the processed signal to the DMA circuit 103. Also, the data transmission circuit 102 processes a signal transmitted from the DMA circuit 103 and transmits the processed signal to the antenna 101. Furthermore, the data transmission circuit 102 gives an interruption signal C1 to the state control circuit 110 in predetermined cases.

The DMA circuit 103 writes a signal from the data transmission circuit 102 in the data RAM 104, and transmits a signal read from the data RAM 104 to the data transmission circuit 102.

The CPU 105 writes/reads data in/from the data RAM 104 and the nonvolatile memory 106. Also, the CPU 105 gives an instruction signal CMD to the state control circuit 107.

The sate control circuit 107 gives a state control signal S1 to the nonvolatile memory 106, a state control signal S2 to the CPU 105, a state control signal S3 to the data transmission circuit 102, a state control signal S4 to the DMA circuit 103 and a state control signal S5 to the data RAM 104.

The nonvolatile memory 106, the CPU 105, the data transmission circuit 102, the DMA circuit 103 and the data RAM 104 go into the operative/halt state in response to the state control signals S1 through S5, respectively.

<Operation>

Figure 2:
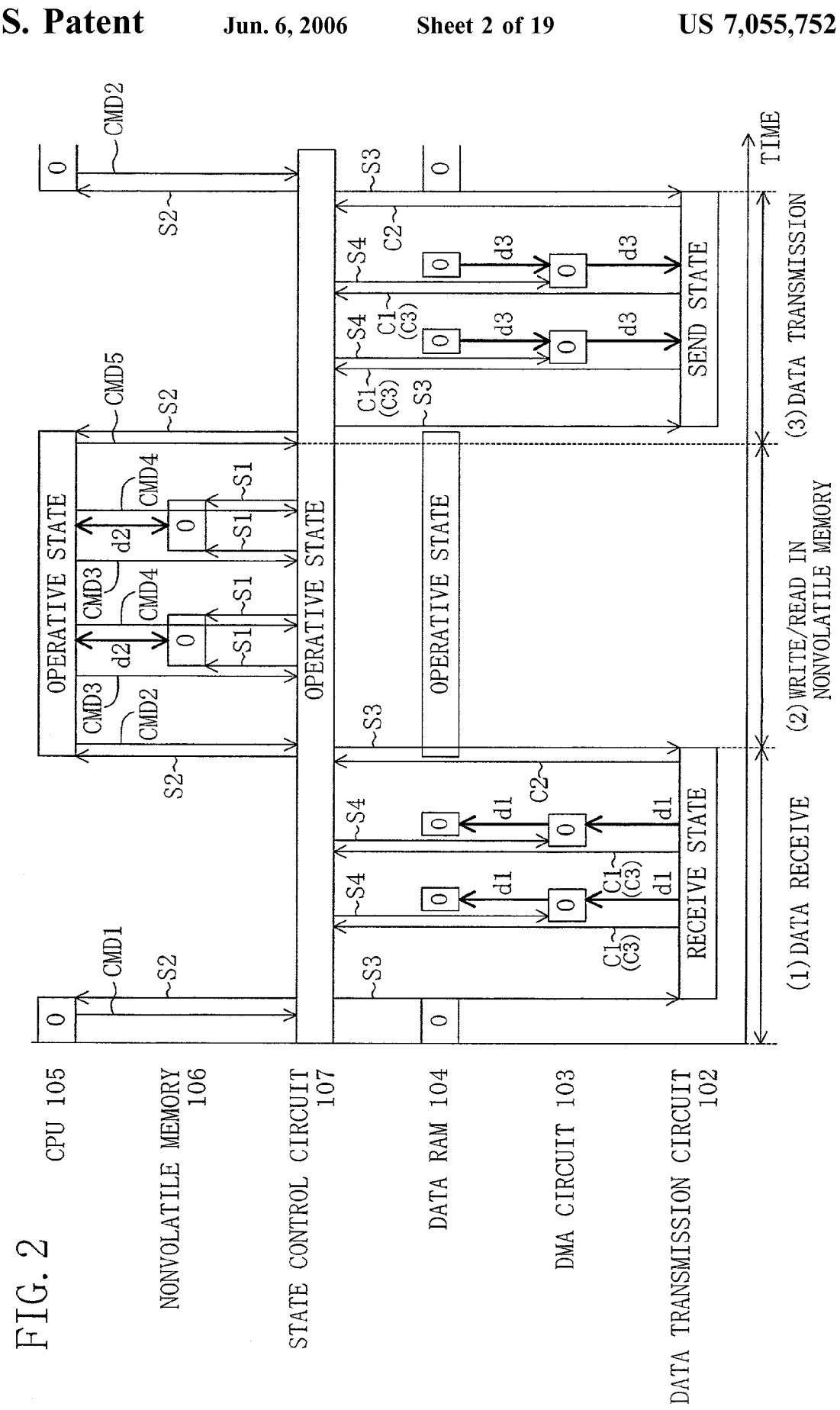
FIG. 2 is a diagram for showing flow of processing in the IC card of FIG. 1.

Next, the operation of the IC card having the aforementioned configuration will be described with reference to FIG. 2. FIG. 2 is a diagram for showing flow of processing carried out in the IC card of FIG. 1. Herein, the operation will be dividedly described with respect to (1) the case of data receive, (2) the case of data write/read in the nonvolatile memory and (3) the case of data transmission.

(1) Case of Data Receive:

It is first assumed that the CPU 105 is in the operative state and that the data transmission circuit 102 is in the halt state. Under these conditions, the CPU 105 gives an instruction signal CMD1 to the state control circuit 107. The instruction signal CMD1 is an instruction to "place the data transmission circuit 102 in the receive state".

When the instruction signal CMD1 is received, the state control circuit 107 gives an inactive state control signal S2 to the CPU 105. In response to the inactive state control signal S2, the CPU 105 stops its operation. Also, the state control circuit 107 gives an active state control signal S3 to the data transmission circuit 102. In response to the active state control signal S3, the data transmission circuit 102 goes into the receive state from the halt state.

The data transmission circuit 102 processes a signal received by the antenna 101 so as to extract data d1 each having 8 bits. Also, the data transmission circuit 102 gives an interruption signal C1 to the state control circuit 107. The interruption signal C1 is a signal corresponding to a request to "place the DMA circuit 103 in the operative state".

When the interruption signal C1 is received, the state control circuit 107 gives an active state control signal S4 to the DMA circuit 103. In response to the active state control signal S4, the DMA circuit 103 goes into the operative state from the halt state. Then, the DMA circuit 103 controls to place the data RAM 104 in the operative state so as to write the data d1 each having 8 bits from the data transmission circuit 102 in the data RAM 104.

When the writing is completed, the DMA circuit 103 and the data RAM 104 go into the halt state.

The processing from the extraction of the data d1 each having 8 bits by the data transmission circuit 102 to the writing in the data RAM 104 by the DMA circuit 103 is repeatedly executed on each data having 8 bits.

When the processing of all the data is completed, namely, when the receive processing is completed, the data transmission circuit 102 gives an interruption signal C2 to the state control circuit 107. The interruption signal C2 is a signal corresponding to a request to "place the CPU 105 in the operative state".

When the interruption signal C2 is received, the state control circuit 107 gives an active state control signal S2 to the CPU 105. In response to the active state control signal S2, the CPU 105 restores to the operative state from the halt state. The restored CPU 105 gives an instruction signal CMD2 to the state control circuit 107. The instruction signal CMD2 is an instruction to "place the data transmission circuit 102 in the halt state".

When the instruction signal CMD2 is received, the state control circuit 107 gives an inactive state control signal S3 to the data transmission circuit 102. In response to the inactive state control signal S3, the data transmission circuit 102 goes into the halt state from the receive state.

(2) Case of Data Write/Read in Nonvolatile Memory:

It is first assumed that the CPU 105 is in the operative state and that the nonvolatile memory 106 is in the halt state. Under these conditions, the CPU 105 gives an instruction signal CMD3 to the state control circuit 107. The instruction signal CMD3 is an instruction to "place the nonvolatile memory 106 in the operative state".

When the instruction signal CMD3 is received, the state control circuit 107 gives an active state control signal S1 to the nonvolatile memory 106. In response to the active state control signal S1, the nonvolatile memory 106 goes into the operative state from the halt state. Then, the CPU 105 writes/reads data d2 in/from the nonvolatile memory 106.

When the writing/reading of the data d2 in/from the nonvolatile memory 106 is completed, the CPU 105 gives an instruction signal CMD4 to the state control circuit 107. The instruction signal CMD4 is an instruction to "place the nonvolatile memory 106 in the halt state".

When the instruction signal CMD4 is received, the state control circuit 107 gives an inactive state control signal S1 to the nonvolatile memory 106. In response to the inactive state control signal S1, the nonvolatile memory 106 stops its operation.

(3) Case of Data Transmission:

It is first assumed that the CPU 105 is in the operative state and that the data transmission circuit 102 is in the halt state. At this point, the CPU 105 stores data to be sent in the data RAM 104. Then, the CPU 105 gives an instruction signal CMD5 to the state control circuit 107. The instruction signal CMD5 is an instruction to "place the data transmission circuit 102 in the send state".

When the instruction signal CMD5 is received, the state control circuit 107 gives an inactive state control signal S2 to the CPU 105. In response to the inactive state control signal S2, the CPU 105 stops its operation. Also, the state control circuit 107 gives an active state control signal S3 to the data transmission circuit 102. In response to the active state control signal S3, the data transmission circuit 102 goes into the send state from the halt state.

The data transmission circuit 102 gives an interruption signal C1 to the state control circuit 107. The interruption signal C1 is a signal corresponding to a request to "place the DMA circuit 103 in the operative state".

When the interruption signal C1 is received, the state control circuit 107 gives an active state control signal S4 to the DMA circuit 103. In response to the active state control signal S4, the DMA circuit 103 goes into the operative state from the halt state. Then, the DMA circuit 103 controls to place the data RAM 104 in the operative state, so as to read data d3 each having 8 bits from the data RAM 104 to transfer them to the data transmission circuit 102. When the transfer is completed, the DMA circuit 103 and the data RAM 104 go into the halt state.

The data transmission circuit 102 processes the data d3 each having 8 bits from the DMA circuit 103 and sends the processed data to the antenna 101.

The processing from the read by the DMA circuit 103 to the transmission by the data transmission circuit 102 is repeatedly executed on each data having 8 bits.

When the processing of all the data to be sent is completed, namely, when the send processing is completed, the data transmission circuit 102 gives an interruption signal C2 to the state control circuit 107. The interruption signal C2 is a signal corresponding to a request to "place the CPU 105 in the operative state".

In response to the interruption signal C2, the state control circuit 107 gives an active state control signal S2 to the CPU 105. In response to the active state control signal S2, the CPU 105 restores to the operative state from the halt state. The restored CPU 105 gives an instruction signal CMD2 to the state control circuit 107. The instruction signal CMD2 is an instruction to "place the data transmission circuit 102 in the halt state".

When the instruction signal CMD2 is received, the state control circuit 107 gives an inactive state control signal S3 to the data transmission circuit 102. In response to the inactive state control signal S3, the data transmission circuit 102 goes into the halt state from the send state.

<Transition of States>

Figure 3:
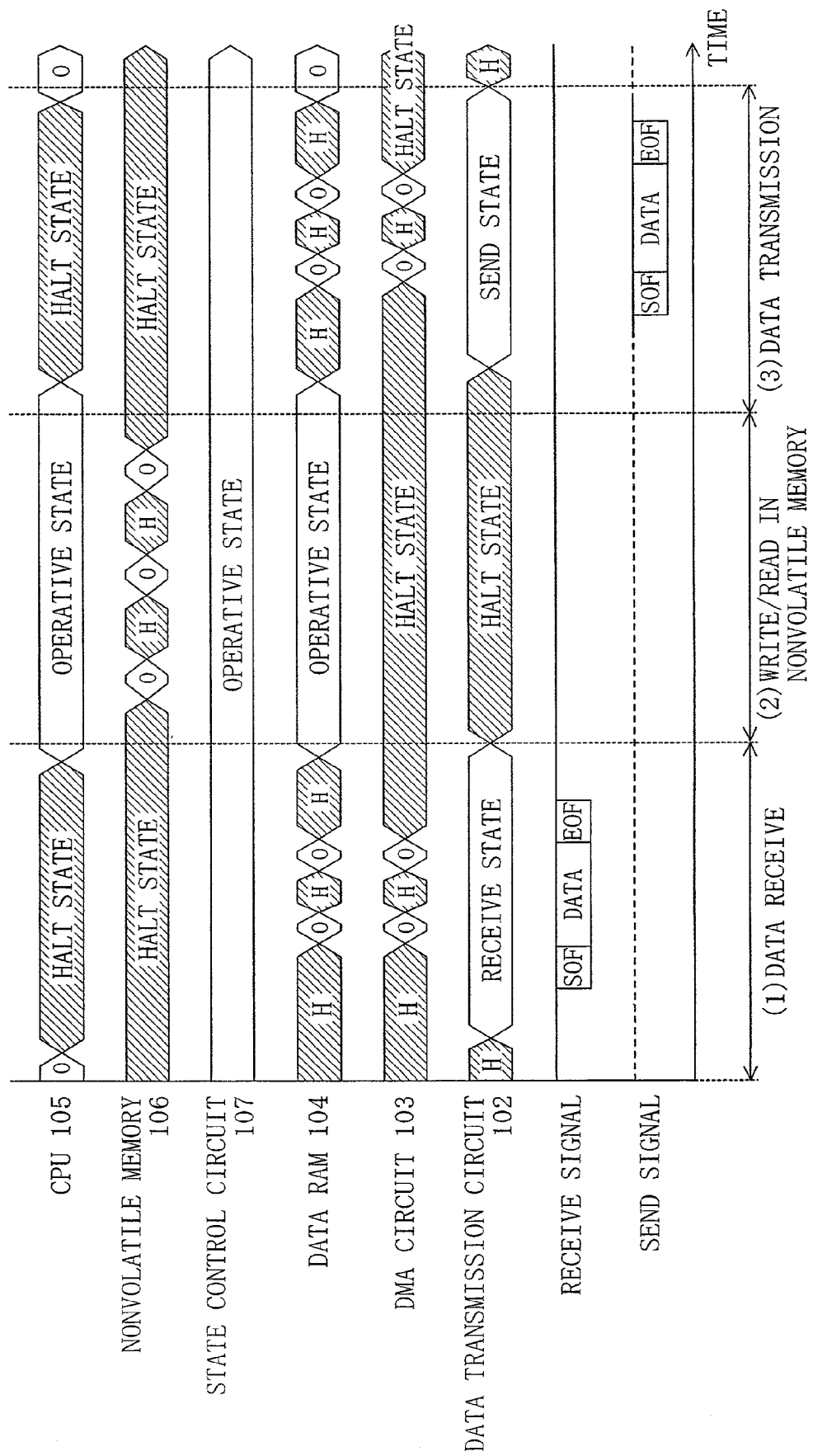
FIG. 3 is a diagram for showing transition of states of a CPU, a nonvolatile memory, a state control circuit, a data RAM, a DMA circuit and a data transmission circuit shown in FIG. 1.

FIG. 3 is a diagram for showing the transition of the states of the CPU 105, the nonvolatile memory 106, the state control circuit 107, the data RAM 104, the DMA circuit 103 and the data transmission circuit 102 of FIG. 1. In FIG. 3, periods (1) through (3) respectively correspond to periods (1) through (3) shown in FIG. 2. Also, "O" means "the operative state" and "H" means "the halt state".

Referring to FIG. 3, during a period when the data transmission circuit 102 is in the receive state for processing a receive signal, the CPU 105 and the nonvolatile memory 106 are in the halt state.

Furthermore, also during a period when the data transmission circuit 102 is in the send state for outputting a send signal, the CPU 105 and the nonvolatile memory 106 are in the halt state.

On the other hand, during a period when the CPU 105 is in the operative state, the data transmission circuit 102 is in the halt state.

In this manner, the data transmission circuit 102 is operated exclusively with the CPU 105 and the nonvolatile memory 106.

The DMA circuit 103 is in the operative state during a period for transferring data while the data transmission circuit 102 is in the receive state or in the send state. The data RAM 104 is in the operative state during a period when the data transmission circuit 102 is in the receive state or in the send state and the DMA circuit 103 is in the operative state and during a period when the CPU 105 is in the operative state. The state control circuit 107 is always in the operative state.

Each of a receive signal and a send signal is composed of an SOF (start of frame), a data portion and an EOF (end of frame) in accordance with the standard of ISO/IEC 14443-3.

In this manner, in the IC card of Embodiment 1, the CPU 105 and the nonvolatile memory 106 are in the halt state during a period when the data transmission circuit 102 is in the receive state for processing a receive signal and during a period when the data transmission circuit 102 is in the send state for outputting a send signal. Therefore, the influence on the data transmission circuit 102 of noise caused by the operations of the CPU 105 and the nonvolatile memory 106 can be suppressed. Accordingly, the reliability of the data transmission circuit 102 in the receive/send processing can be improved. Similarly, also in the case where one reader/writer simultaneously writes/reads data in/from a plurality of IC cards, the nonvolatile memory and the CPU included in each of the IC cards stop their operations while the transmission circuit of each IC card is sending/receiving data to/from the outside. Therefore, mutual interference due to noise caused in the respective IC cards can be prevented, so as to improve the reliability in receiving/sending data of the plural IC cards.

Embodiment 2

<Configuration>

Figure 4:
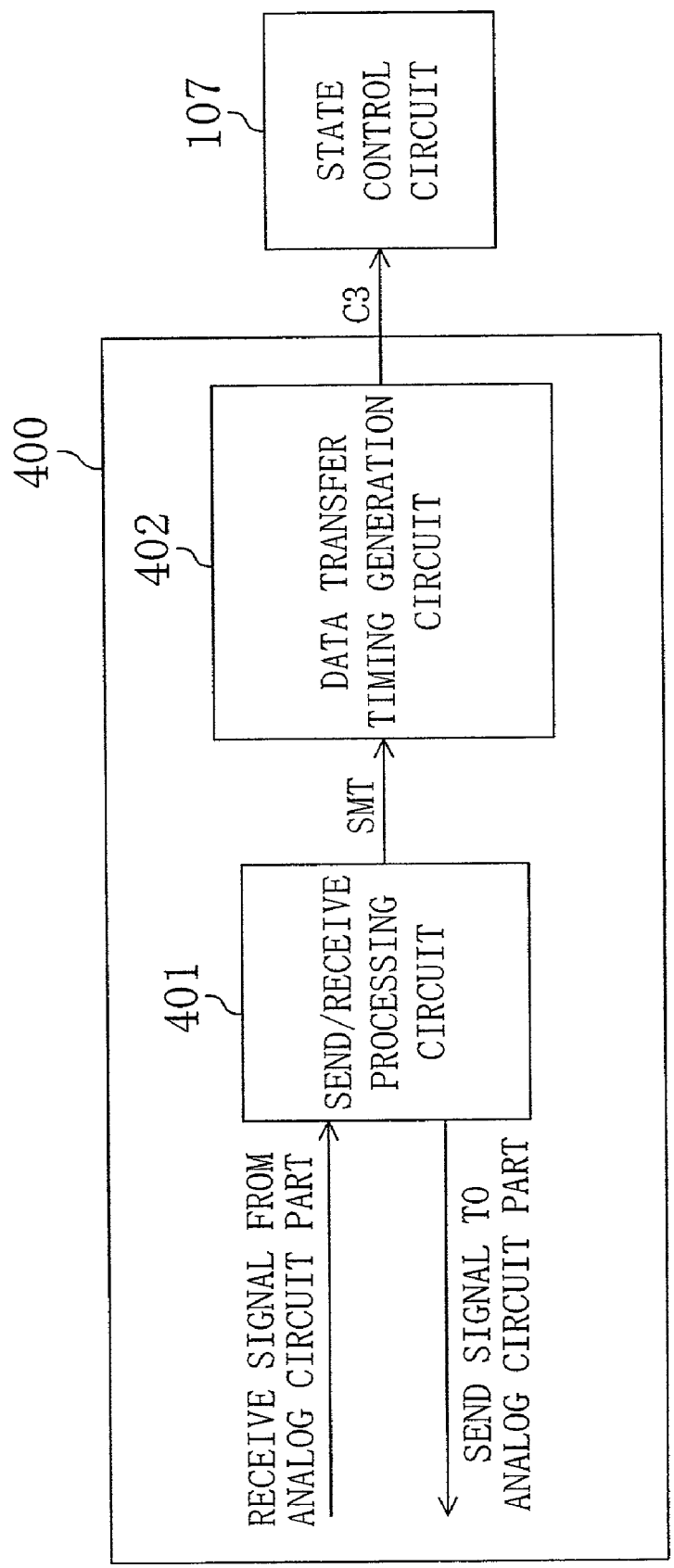
FIG. 4 is a block diagram for showing the configuration of a data transmission circuit included in an IC card according to Embodiment 2 of the invention.

An IC card according to Embodiment 2 of the invention includes a data transmission circuit 400 shown in FIG. 4 instead of the data transmission circuit 102 of FIG. 1. Referring to FIG. 4, the data transmission circuit 400 includes, in addition to the function of the data transmission circuit 102 of FIG. 1, a send/receive processing circuit 401 and a data transfer timing generation circuit 402.

The send/receive processing circuit 401 determines the state of a receive signal and a send signal from and to an analog circuit part (not shown) included in the data transmission circuit 400 in accordance with the standard of ISO/IEC 14443-3, and outputs state information SMT corresponding to the state.

The data transfer timing generation circuit 402 outputs an interruption signal C3 to the state control circuit 107 in response to state information SMT corresponding to "a signal currently received by the data transmission circuit 400 being in a period of a stop bit", state information SMT corresponding to "a signal currently sent by the data transmission circuit 400 being in a period of H level (logical H level) of the SOF", or state information SMT corresponding to "a signal currently sent by the data transmission circuit 400 being in a period of a stop bit".

<Operation>

The operation of the IC card having the aforementioned configuration will now be described.

Figure 5:
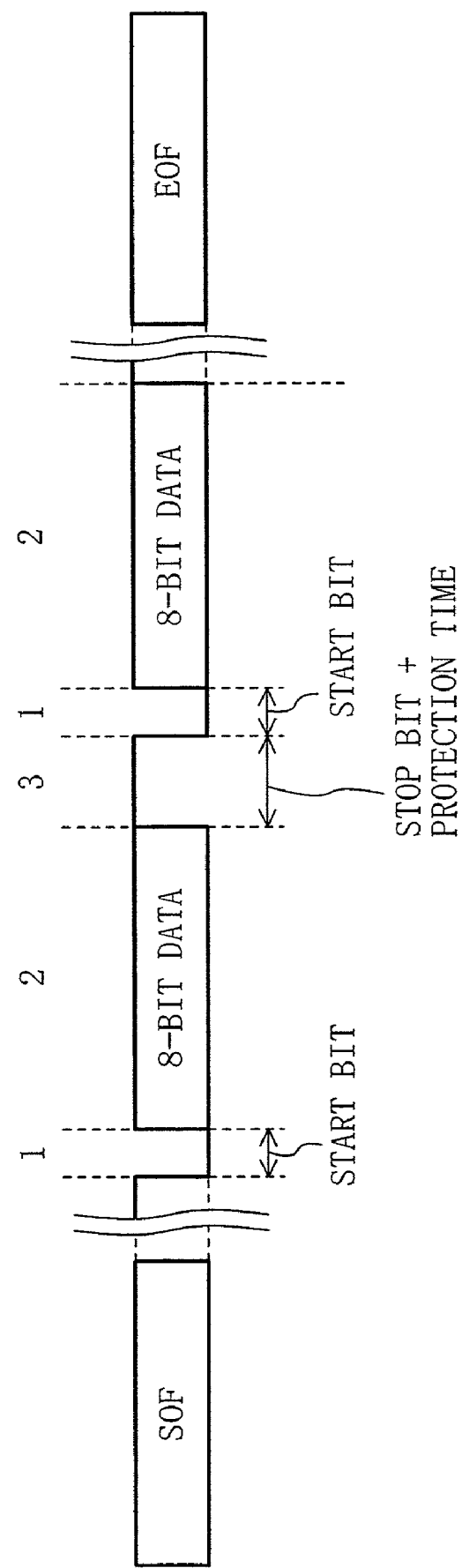
FIG. 5 is a diagram of a character format standardized by ISO/IEC 14443-3.

As described above, data to be sent or received is composed of an SOF, a data portion and an EOF in accordance with the standard of ISO/IEC 14443-3. The data portion complies with a character format standardized by ISO/IEC 14443-3 as shown in FIG. 5. A character includes a start bit at a first logical level, an 8-bit data at a second logical level and a stop bit and protection time at a third logical level.

Now, the operation will be dividedly described with respect to (a) the case of data receive and (b) the case of data transmission.

(a) Case of Data Receive:

This corresponds to (1) the case of data receive shown in FIG. 2.

First, when the data transmission circuit 102 is in the receive state, a receive signal is input to the send/receive processing circuit 401.

The send/receive processing circuit 401 determines the state of the receive signal in accordance with the standard of ISO/IEC 14443-3, and outputs state information SMT corresponding to the state.

When the state information SMT is received from the send/receive processing circuit 401, a data transfer state control circuit 403 determines whether or not the state information SMT corresponds to "a signal currently received by the data transmission circuit 400 being in a period of a stop bit". As a result, when the state information SMT is determined to correspond to "a signal currently received by the data transmission circuit 400 being in a period of a stop bit", an interruption signal C3 is output to the state control circuit 107. This corresponds to the processing for giving the interruption signal C1 in FIG. 2.

In response to the interruption signal C3, the state control circuit 107 gives an active state control signal S4 to the DMA circuit 103. This corresponds to the case of giving the active state signal S4 in FIG. 2.

In response to the active state control signal S4, the DMA circuit 103 goes into the operative state from the halt state. Then, the DMA circuit 103 controls to place the data RAM 104 in the operative state so as to write data d1 each having 8 bits from the data transmission circuit 102 in the data RAM 104. When the transfer is completed, the DMA circuit 103 and the data RAM 104 go into the halt state.

(b) Case of Data Transmission:

This corresponds to (3) the case of transmission shown in FIG. 2.

The send/receive processing circuit 401 receives a signal sent by the data transmission circuit 102. Then, the send/receive processing circuit 401 determines the state of the receive signal in accordance with the standard of ISO/IEC 14443-3, and outputs state information SMT corresponding to the state.

When the state information SMT is received from the send/receive processing circuit 401, the data transfer state control circuit 403 determines whether or not the state information SMT corresponds to "a signal currently sent by the data transmission circuit 400 being in a period of H level (logical H level) of the SOF" or "a signal currently sent by the data transmission circuit 400 being in a period of a stop bit". As a result, when the state information SMT is determined to be either, an interruption signal C3 is output to the state control circuit 107. This corresponds to the processing for giving the interruption signal C1 in FIG. 2.

In response to the interruption signal C3, the state control circuit 107 gives an active state control signal S4 to the DMA circuit 103. This corresponds to the case of giving the active state signal S4 in FIG. 2.

In response to the active state control signal S4, the DMA circuit 103 goes into the operative state from the halt state. Then, the DMA circuit 103 controls to place the data RAM 104 in the operative state so as to read data d3 each having 8 bits from the data RAM 104 to transfer them to the data transmission circuit 102. When the transfer is completed, the DMA circuit 103 and the data RAM 104 go into the halt state.

Figure 6:
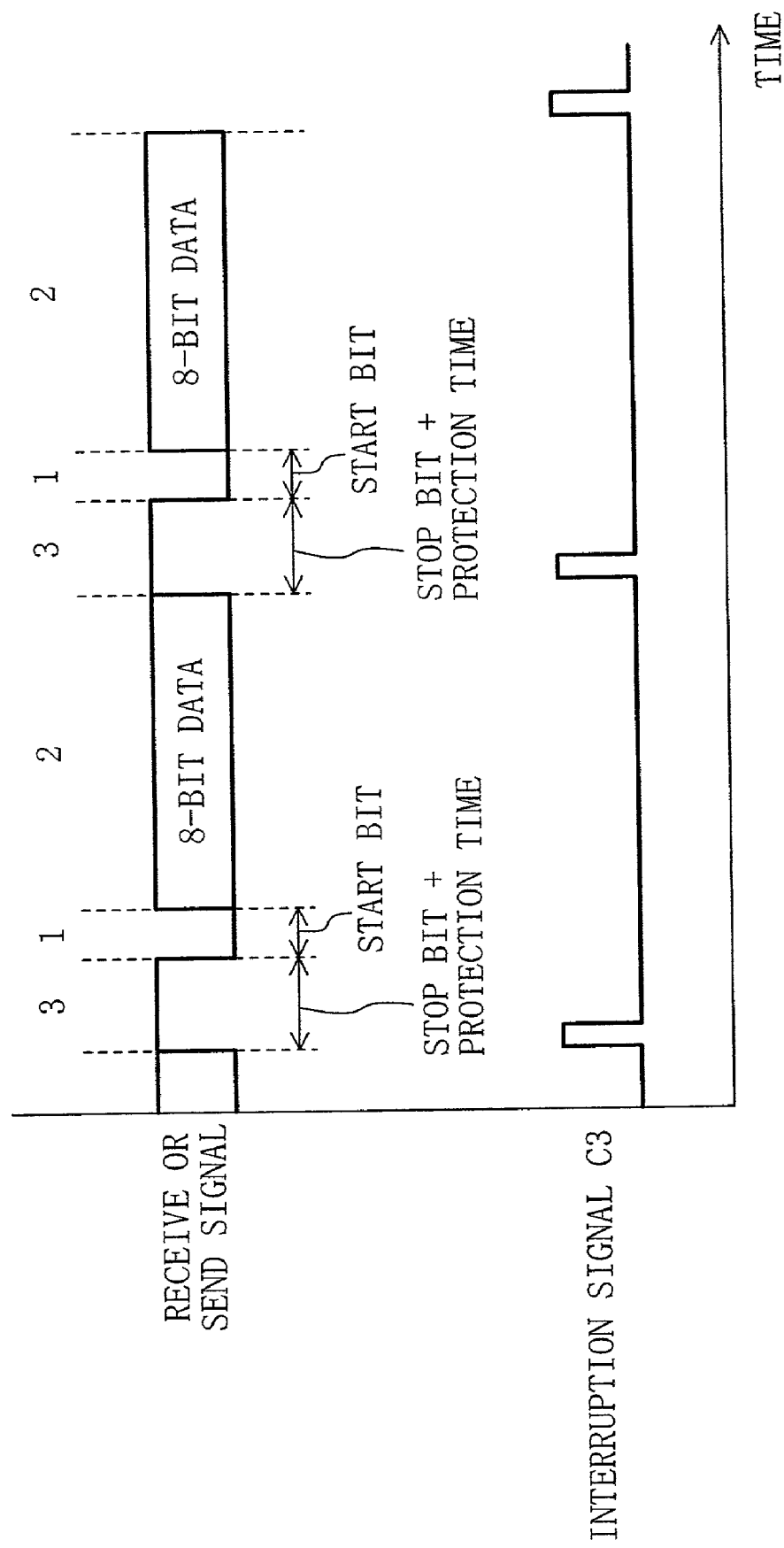
FIG. 6 is a diagram for showing timing of a receive signal, a send signal and an interruption signal.

FIG. 6 is a diagram for showing timing of a receive signal, a send signal and an interruption signal C3. As shown in FIG. 6, the data transfer timing generation circuit 402 outputs an interruption signal C3 in a period between one 8-bit data period and another 8-bit data period in the receive signal or the send signal.

In this manner, according to Embodiment 2, since the send/receive processing circuit 401 and the data transfer timing generation circuit 402 are provided, data can be transferred by the DMA circuit 102 at timing between a period corresponding to one 8-bit data and a period corresponding to another 8-bit data in a signal received or sent by the data transmission circuit 102. As a result, the signal received/sent by the data transmission circuit 102 can be prevented from being changed due to the influence of noise caused by the operation of the DMA circuit 102.

Embodiment 3

Figure 7:
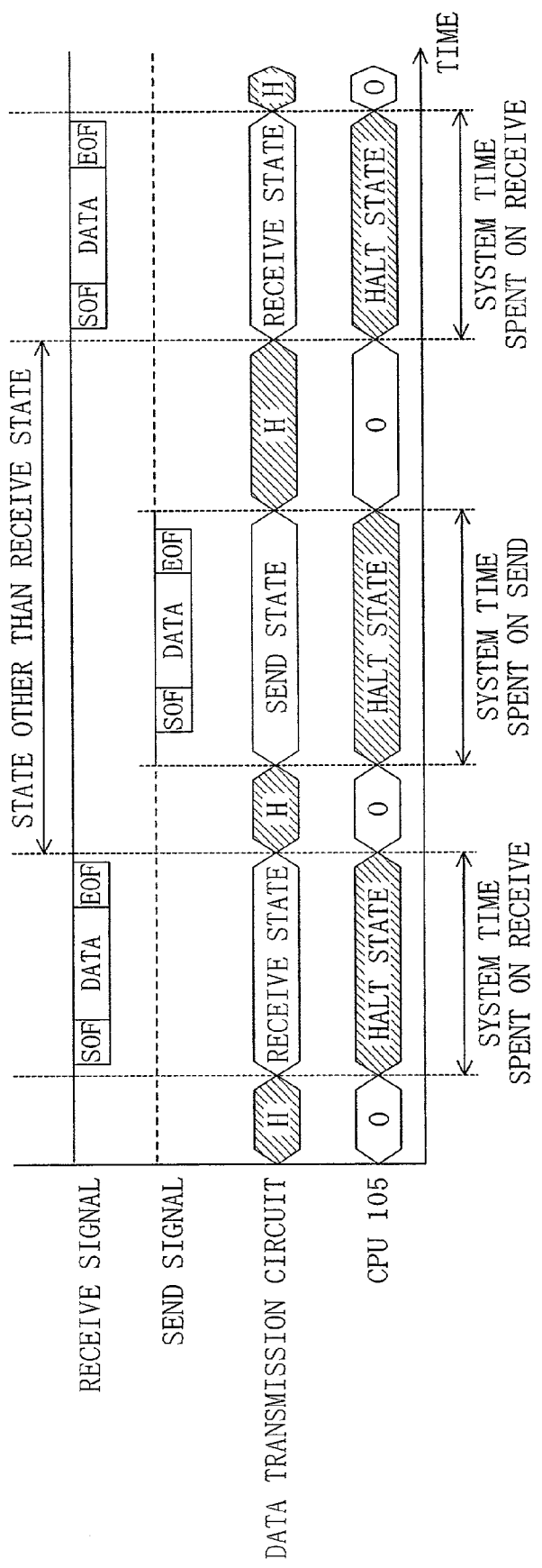
FIG. 7 is a diagram for showing states of a receive signal, a send signal, a data transmission circuit and a CPU.
Figure 8:
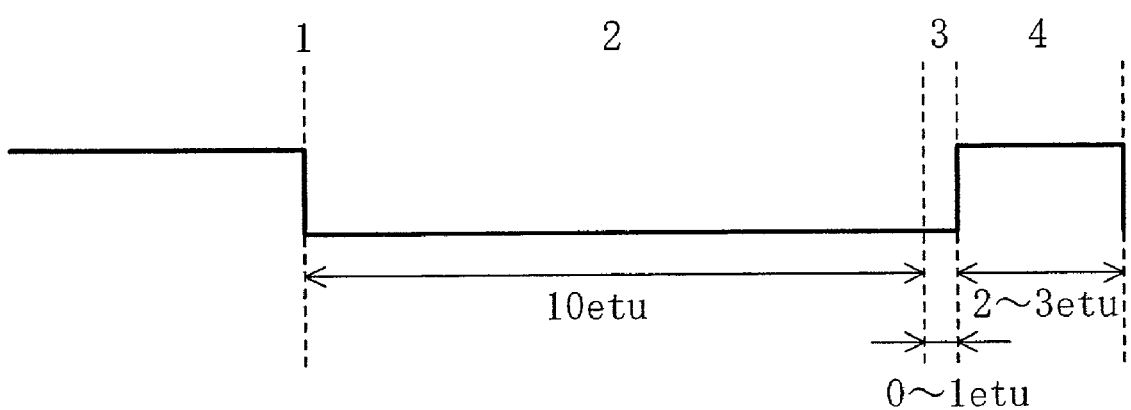
FIG. 8 is a diagram for showing the structure of an SOF standardized by ISO/IEC 14443-3.

In the data transmission circuit 102 of FIG. 1, a signal received by the antenna 101 is modulated into digital data by an analog circuit part (not shown) such as a modulator, so as to obtain a receive signal as shown in FIG. 7. As shown in FIG. 7, a receive signal is composed of an SOF, a data portion and an EOF and is at a logical high level when the data transmission circuit 102 is in a state other than the receive state. Also, the SOF has a structure according with the standard of ISO/IEC 14443-3 as shown in FIG. 5. The SOF is composed of a fall at a first logical level, 10-etu period low (logical low level) at a second logical level, a rise within 1 etu at a third logical level and 2 through 3-etu period high (logical high level) at a fourth logical level. It is noted that etu is a unit of time.

However, when the data transmission circuit 102 is in a state other than the receive state, the analog circuit part can be affected by noise caused by the operations of the CPU 105, the nonvolatile memory 106 and the like, so that a receive signal may fall to a logical low level when the data transmission circuit 102 is in a state other than the receive state. As a result, there arises a problem that the SOF cannot be correctly identified in a logic circuit part following the analog circuit part. The object of an IC card according to Embodiment 3 is overcoming this problem.

<Configuration>

Figure 9:
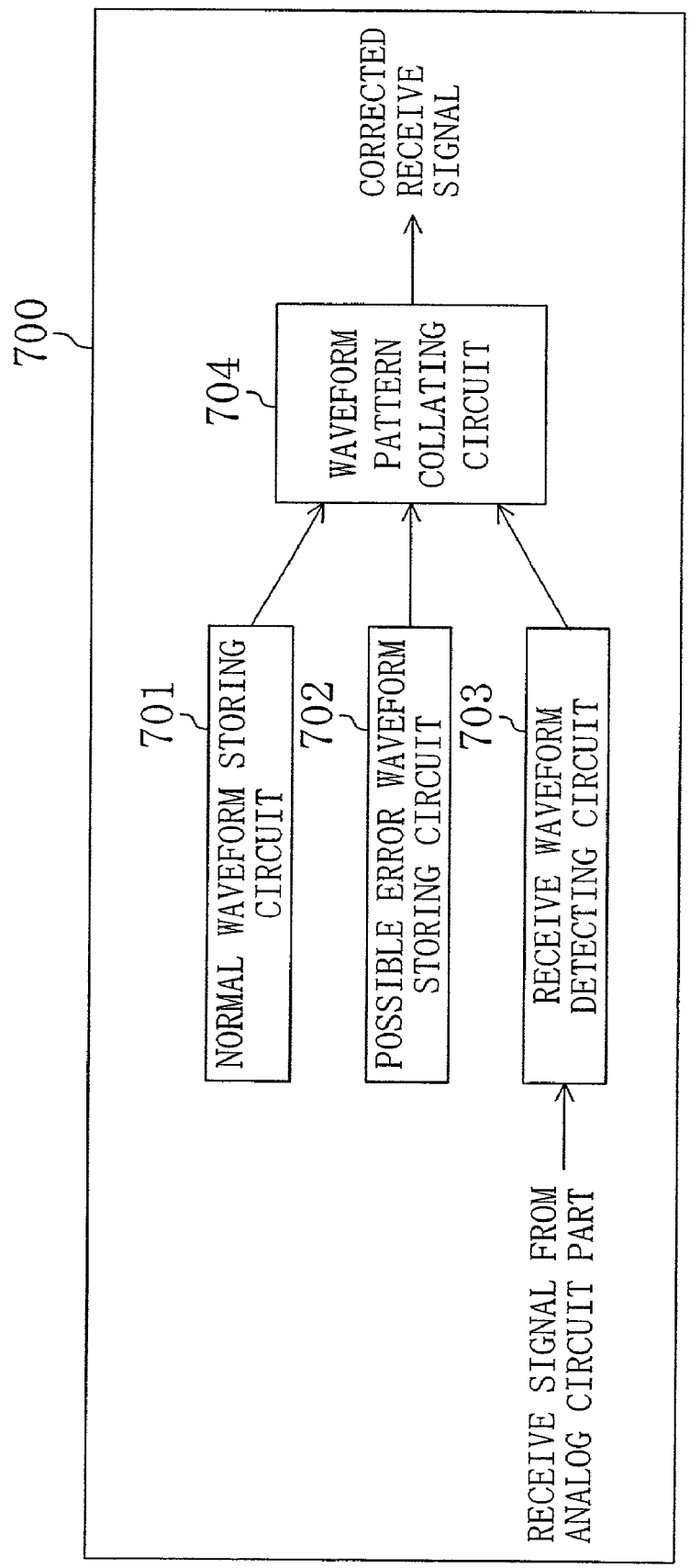
FIG. 9 is a block diagram for showing the configuration of a data transmission circuit included in an IC card according to Embodiment 3 of the invention.

The IC card of Embodiment 3 of this invention includes a data transmission circuit 700 of FIG. 9 instead of the data transmission circuit 102 of FIG. 1. Referring to FIG. 9, the data transmission circuit 700 has the function of the data transmission circuit 102 of FIG. 1 and additionally includes a normal waveform storing circuit 701, a possible error waveform storing circuit 702, a receive waveform detecting circuit 703 and a waveform pattern collating circuit 704.

The normal waveform storing circuit 701 stores a waveform pattern of the SOF according to the standard of ISO/IEC 14443-3. The possible error waveform storing circuit 702 stores a previously predicted error waveform pattern. For example, in the case where the analog circuit part is affected by noise caused by the operations of the CPU 105, the nonvolatile memory 106 and the like when the data transmission circuit 102 is in a state other than the receive state, the SOF of a receive signal has a waveform pattern having a fall earlier than the fall at a first logical level according to the standard of ISO/IEC 14443-3. Such a previously predicted error waveform pattern is stored. The receive waveform detecting circuit 703 detects the waveform pattern of the SOF of a receive signal output from the analog circuit part. The waveform pattern collating circuit 704 determines whether or not the waveform pattern of the SOF detected by the receive waveform detecting circuit 703 accords with the waveform pattern stored in the normal waveform storing circuit 701 or the waveform pattern stored in the possible error waveform storing circuit 702. When it accords with either waveform pattern, the waveform pattern of the SOF of the receive signal is corrected to the waveform pattern stored in the normal waveform storing circuit 701.

<Operation>

Figure 10:
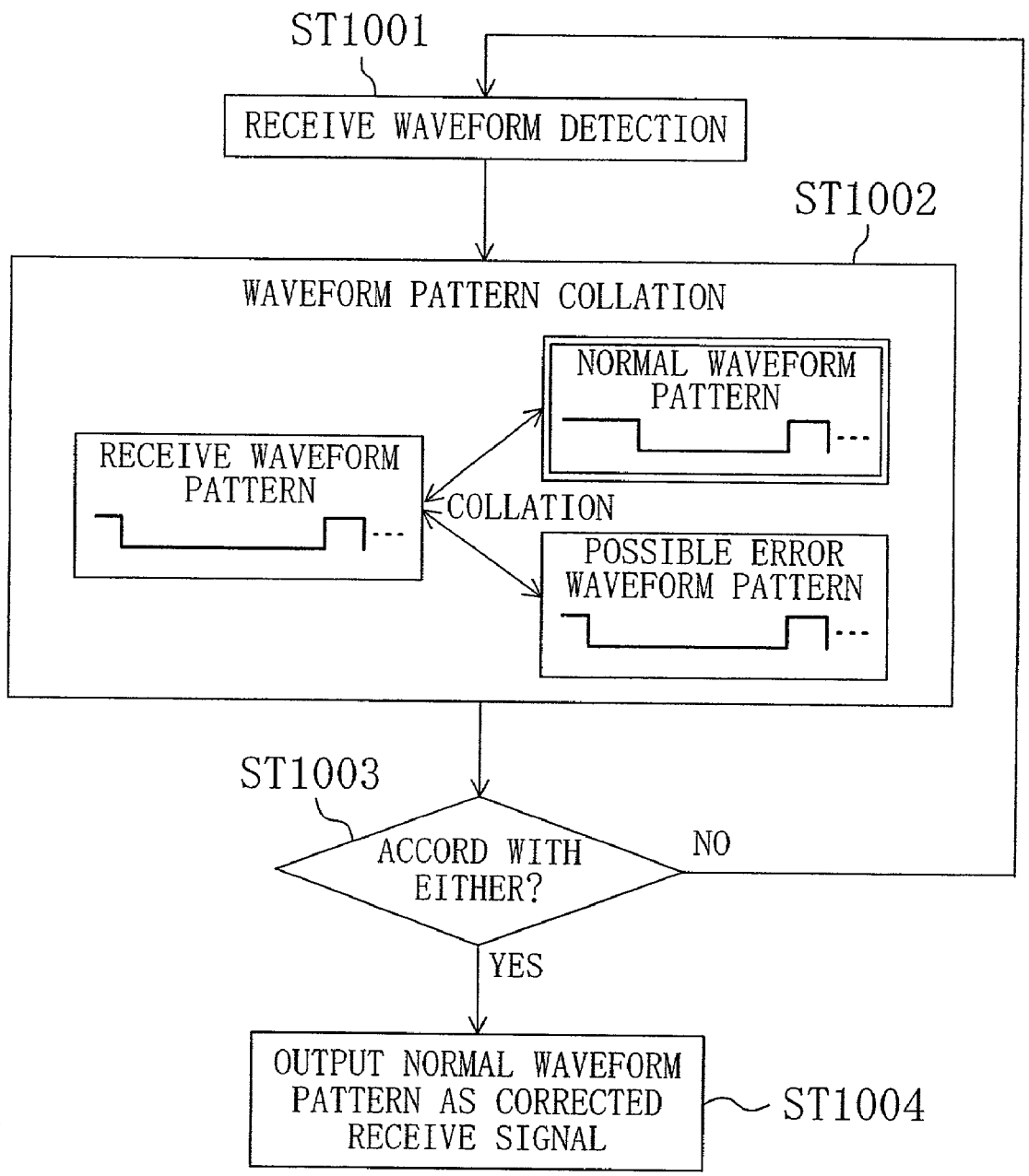
FIG. 10 is a flowchart for showing the operation of the IC card of Embodiment 3 of the invention.

Now, the operation of the IC card having the aforementioned configuration will be described with reference to FIG. 10.

Previously, a waveform pattern according to the standard of ISO/IEC 14443-3 is stored in the normal waveform storing circuit 701 and a predicted error waveform pattern is stored in the possible error waveform storing circuit 702.

In step ST1001, a waveform pattern of the SOF of a receive signal output from the analog circuit part is detected by the receive waveform detecting circuit 703.

Subsequently, in step ST1002, the waveform pattern of the SOF of the receive signal is collated with the waveform pattern stored in the normal waveform storing circuit 701 and the waveform pattern stored in the possible error waveform storing circuit 702.

Next, in step ST1003, it is determined whether or not the waveform pattern of the SOF of the receive signal accords with the waveform pattern stored in the normal waveform storing circuit 701 or the waveform pattern stored in the possible error waveform storing circuit 702.

When it is determined that the waveform pattern accords with either, the procedure proceeds to step ST1004. Then, in step ST1004, the waveform pattern of the SOF of the receive signal is corrected to the waveform pattern stored in the normal waveform storing circuit 701.

When it is determined that the waveform pattern accords with neither, the procedure returns to step ST1001.

In this manner, according to Embodiment 3, when a receive signal includes a previously predicted error, it can be corrected. Accordingly, the problem that the SOF cannot be correctly identified in the logic circuit part following the analog circuit part can be avoided.

Although the number of possible error waveform storing circuit 702 is herein one, it can be plural in number. Thus, a larger number of pattern errors possibly included in a receive signal can be corrected.

Embodiment 4

<Configuration>

Figure 11:
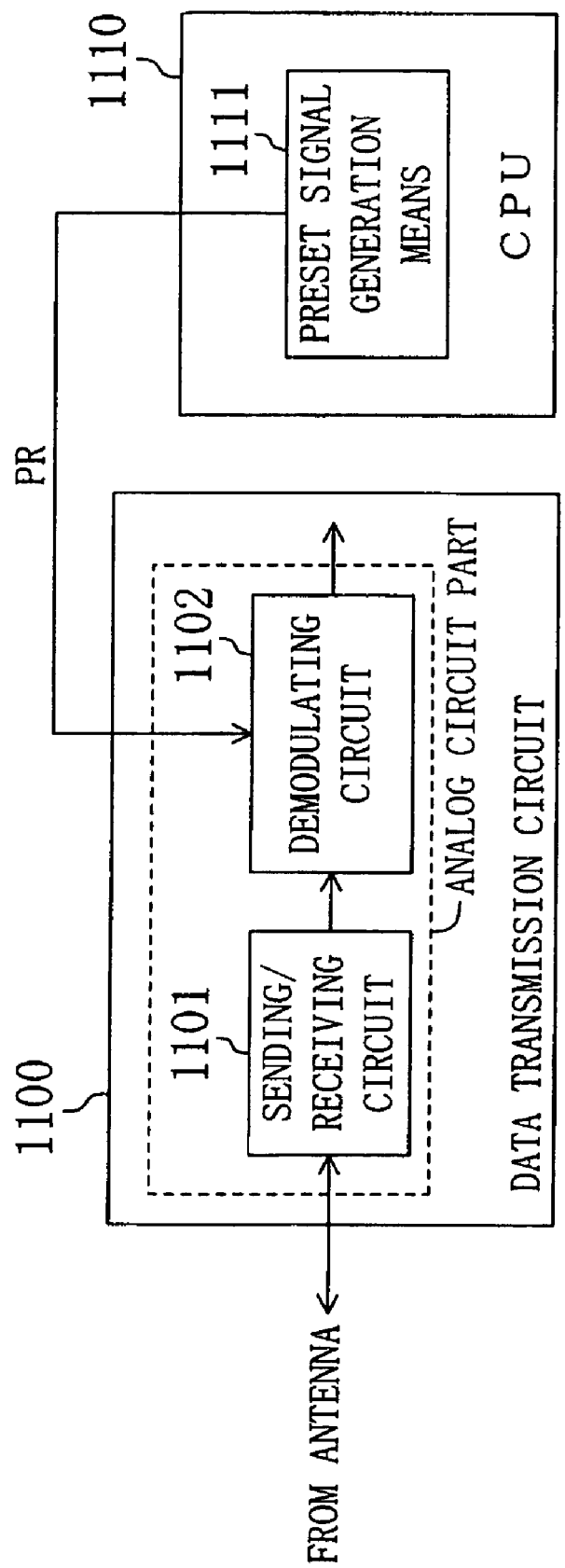
FIG. 11 is a block diagram for showing the configuration of a data transmission circuit and a CPU included in an IC card according to Embodiment 4 of the invention.

An IC card according to Embodiment 4 of the invention includes a data transmission circuit 1100 and a CPU 1110 of FIG. 11 instead of the data transmission circuit 102 and the CPU 105 of FIG. 1.

Referring to FIG. 11, the data transmission circuit 1100 includes a sending/receiving circuit 1101 and a demodulating circuit 1102. The sending/receiving circuit 1101 transmits a signal received by the antenna 101 to the demodulating circuit 1102. The demodulating circuit 1102 demodulates the signal from the sending/receiving circuit 1101 into a digital signal to be output. The signal output from the demodulating circuit 1102 is similar to the receive signal shown in FIG. 7. The signal output from the demodulating circuit 1102 is processed by a following logical circuit part (not shown) to be transmitted by the DMA circuit 103.

Also, the demodulating circuit 102 sets the level of its output signal to a logical high level in response to an active preset signal PR.

The CPU 1110 includes preset signal generation means 1111. The preset signal generation means 1111 gives the demodulating circuit 1102 a preset signal PR that is active for a predetermined period while the data transmission circuit 1100 is in a state other than the receive state.

<Operation>

Figure 12:
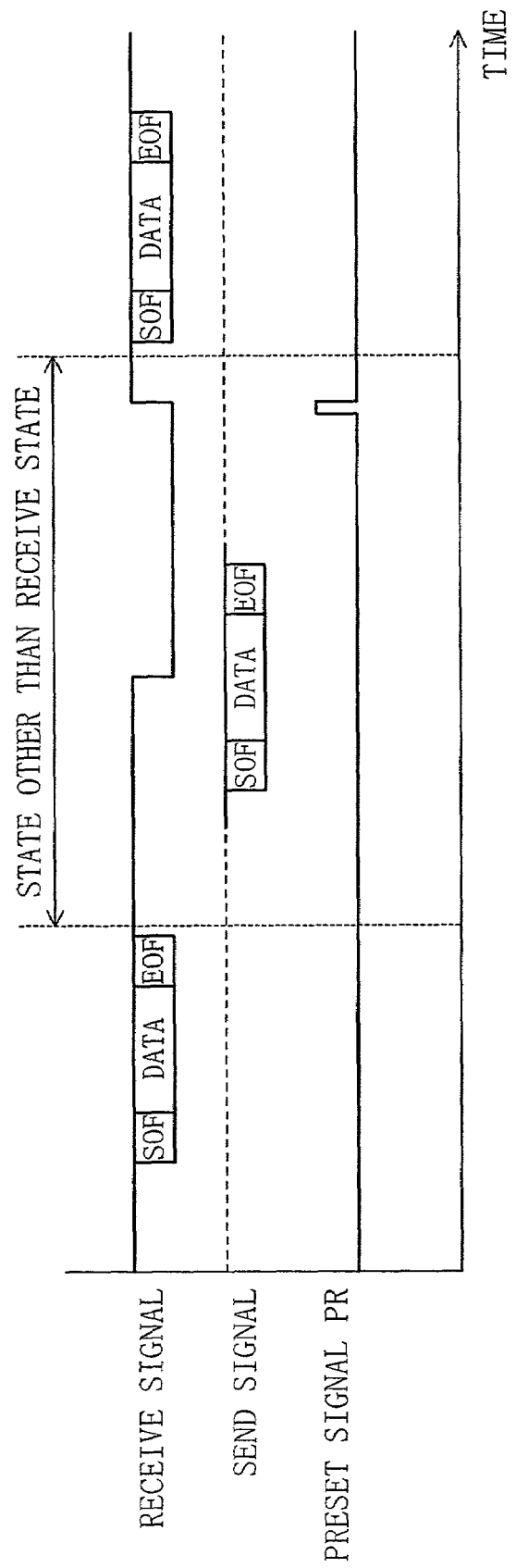
FIG. 12 is a diagram for showing the relationship between a receive signal and a preset signal.

As shown in FIG. 7, the signal output from the demodulating circuit 1102 is at a logical high level when the data transmission circuit 102 is in a state other than the receive state. However, in the case where the demodulating circuit 1102 malfunctions due to noise caused by the operations of the CPU 105 and the nonvolatile memory 106 or by conducting the send processing when the data transmission circuit 102 is in a state other than the receive state, the signal output from the demodulating circuit 1102 may fall to a logical low level as shown in FIG. 12. If the data transmission circuit 1100 goes into the receive state with the signal output from the demodulating circuit 1102 at a logical low level, a fall of the SOF cannot be correctly identified in the following logical circuit part.

In the IC card of Embodiment 4, as shown in FIG. 12, the preset signal generation means 1111 gives the demodulating circuit 1102 a preset signal PR that is active during a predetermined period while the data transmission circuit 1100 is in a state other than the receive state. In response to the active preset signal PR, the demodulating circuit 1102 sets the level of its output signal to a logical high level. Therefore, even when the signal output from the demodulating circuit 1102 falls to a logical low level, the data transmission circuit can be prevented from going into the receive state with the signal output from the demodulating circuit 1102 at a logical low level. As a result, a fall of the SOF can be correctly identified in the following logic circuit part.

Embodiment 5

<Configuration>

Figure 13:
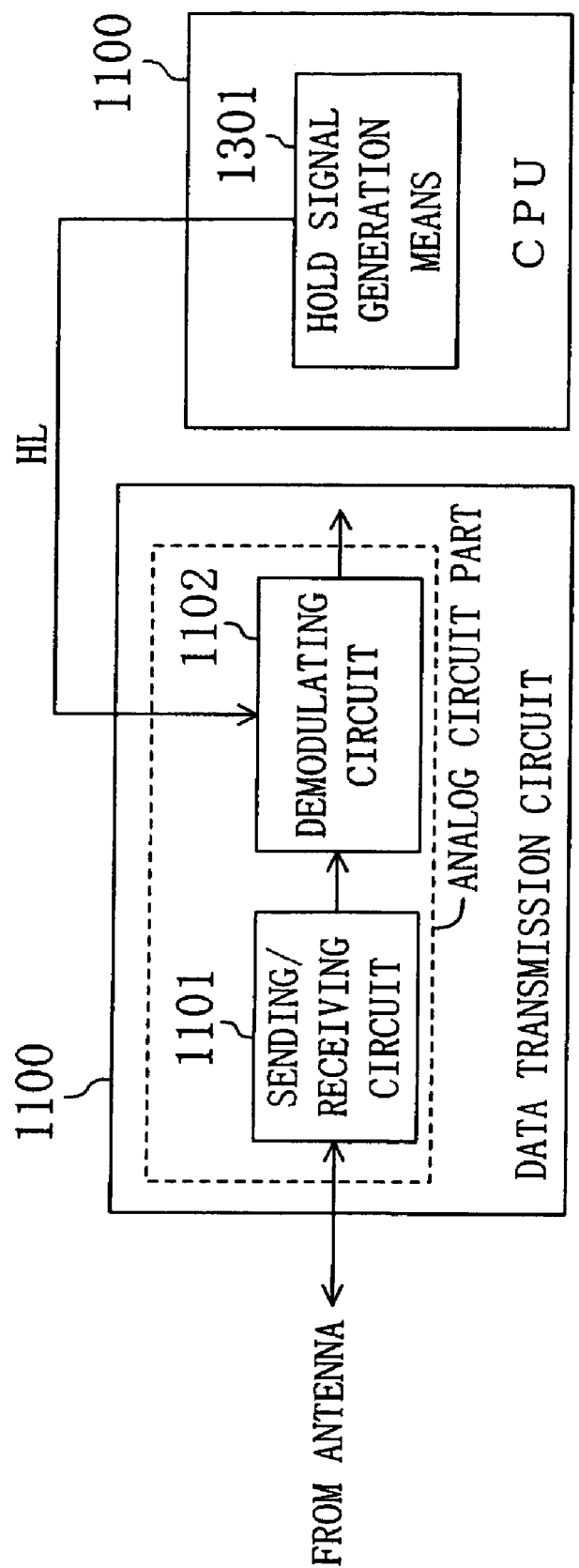
FIG. 13 is a block diagram for showing the configuration of a data transmission circuit and a CPU included in an IC card according to Embodiment 5 of the invention.

An IC card according to Embodiment 5 of the invention is characterized by including hold signal generation means 1301 of FIG. 13 instead of the preset signal generation means 1111 of FIG. 11.

Referring to FIG. 13, the hold signal generation means 1301 gives the demodulating circuit 1102 a hold signal HL that is active during a period while the data transmission circuit 1100 is in a state other than the receive state. In response to the active hold signal HL, the demodulating circuit 1102 sets the level of its output signal to a logical high level.

<Operation>

Figure 14:
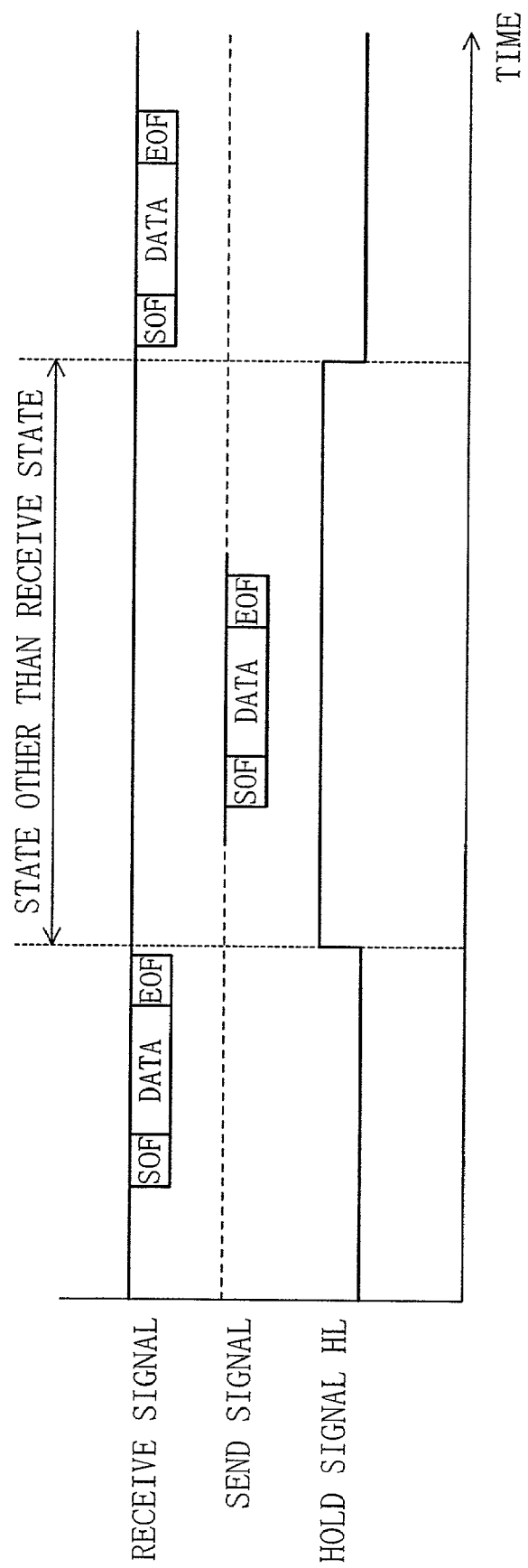
FIG. 14 is a diagram for showing the relationship between a receive signal and a hold signal.

In the IC card having the aforementioned configuration, as shown in FIG. 14, the hold signal generation means 1301 gives the demodulating circuit 1102 a hold signal HL that is active during a period while the data transmission circuit 1100 is in a state other than the receive state. In response to the active hold signal HL, the demodulating circuit 1102 sets the level of its output signal to a logical high level. Thus, the data transmission circuit can be prevented from going into the receive state with the signal output from the demodulating circuit 1102 at a logical low level. As a result, a fall of the SOF can be correctly identified in the following logic circuit part.

Embodiment 6

Figure 15:
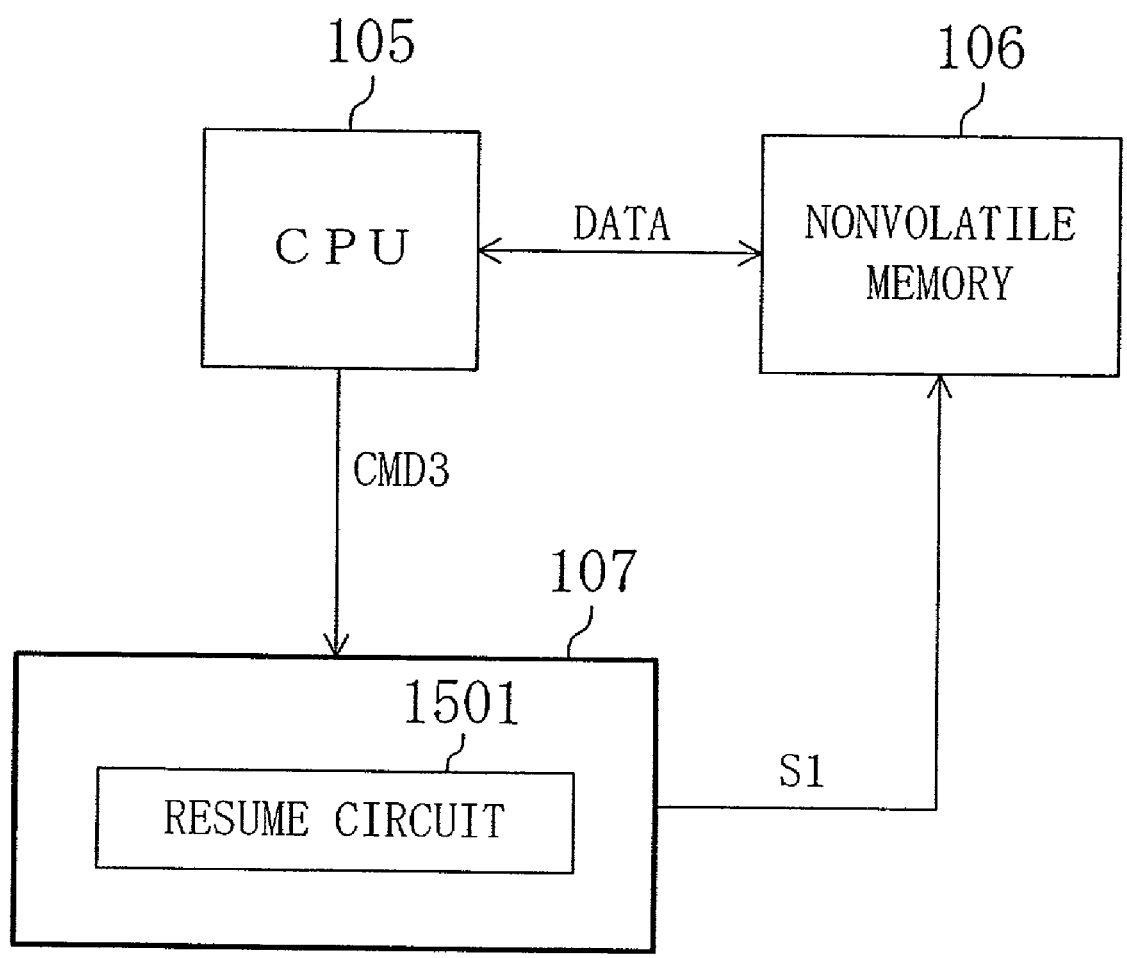
FIG. 15 is a block diagram for showing the configuration of a principal part of an IC card according to Embodiment 6 of the invention.

FIG. 15 is a block diagram for showing the configuration of a principal part of an IC card according to Embodiment 6 of the invention. Referring to FIG. 15, the IC card is characterized by including a resume circuit 1501 within the state control circuit 107. The rest of the configuration is the same as that of the IC card shown in FIG. 1.

When the nonvolatile memory 106 goes into the halt state from the operative state, the resume circuit 1501 stores time spent on the write processing on the nonvolatile memory 106, and an address and data for the write processing.

Figure 16:
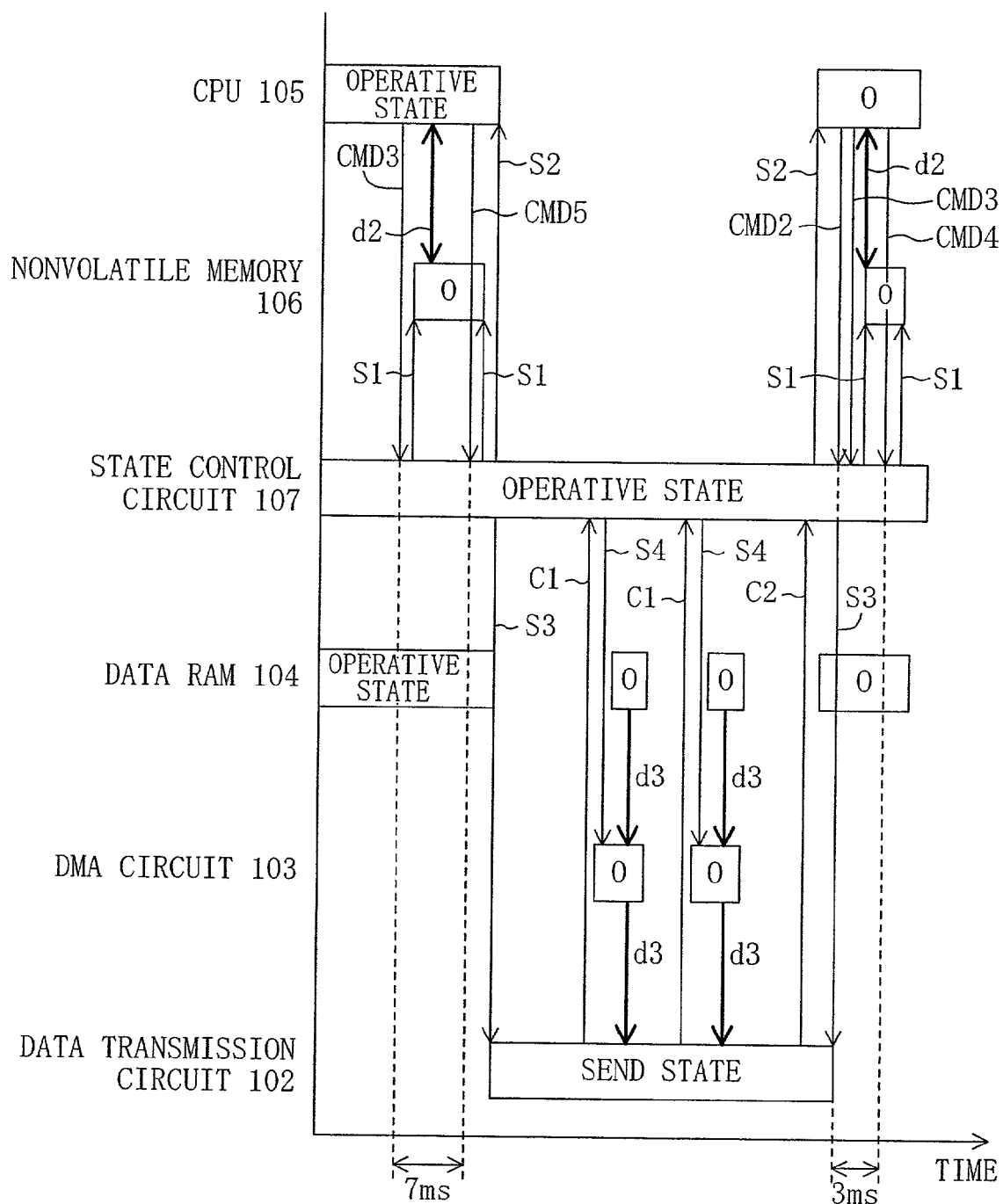
FIG. 16 is a diagram for explaining the operation of the IC card shown in FIG. 15.

Next, the operation of the IC card having the aforementioned configuration will be described with reference to FIG. 16.

In the case where a data is to be written in the nonvolatile memory 106, the CPU 105 gives an instruction signal CMD3 to the state control circuit 107 first. The instruction signal CMD3 is an instruction to "place the nonvolatile memory 106 in the operative state".

When the instruction signal CMD3 is received, the state control circuit 107 gives an active state control signal S1 to the nonvolatile memory 106. In response to the active state control signal S1, the nonvolatile memory 106 goes into the operative state from the halt state.

On the other hand, the resume circuit 1501 starts counting time in response to the instruction signal CMD3.

In order to completely write a data in the nonvolatile memory 106, a voltage should be applied for a predetermined time period. Herein, it is assumed that a voltage should be applied for a period of 10 ms. After starting the write processing in the nonvolatile memory 106, the CPU 105 refers the time shown by the resume circuit 1501. When the time reaches 10 ms, it is determined that the data has been completely written. Then, the CPU 105 gives an instruction signal CMD4 to the state control circuit 107. The instruction signal CMD4 is an instruction to "place the nonvolatile memory 106 in the halt state".

When the instruction signal CMD4 is received, the state control circuit 107 gives an inactive state control signal S1 to the nonvolatile memory 106. In response to the inactive state control signal S1, the nonvolatile memory 106 stops its operation.

At this point, processing to be conducted when a send processing instruction is issued by the CPU 105 after the write processing on the nonvolatile memory 106 is started and before the time shown by the resume circuit 1501 reaches 10 ms will be described.

It is herein assumed that the CPU 105 gives an instruction signal CMD5 to the state control circuit 107 before the time shown by the resume circuit 1501 reaches 10 ms, namely, when the time is, for example, 7 ms. The instruction signal CMD5 is an instruction to "place the data transmission circuit 102 in the send state".

In response to the instruction signal CMD5, the resume circuit 107 stores a state of the write processing attained at this point, namely, an address and data for the write processing and time spent on the write processing up to this point (herein 7 ms).

On the other hand, when the instruction signal CMD5 is received, the state control circuit 107 gives an inactive state control signal S2 to the CPU 105. In response to the inactive state control signal S2, the CPU 105 stops its operation. Also, the state control circuit 107 gives an active state control signal S3 to the data transmission circuit 102. In response to the active state control signal S3, the data transmission circuit 102 goes into the send state from the halt state. Thereafter, the send processing is carried out in the same manner as shown in FIG. 2.

When the send processing is completed, the data transmission circuit 102 gives an interruption signal C2 to the state control circuit 107. The interruption signal C2 is a signal corresponding to a request to "place the CPU 105 in the operative state".

In response to the interruption signal C2, the state control circuit 107 gives an active state control signal S2 to the CPU 105. In response to the active state control signal S2, the CPU 105 restores to the operative state from the halt state.

The restored CPU 105 gives an instruction signal CMD2 to the state control circuit 107. The instruction signal CMD2 is an instruction to "place the data transmission circuit 102 in the halt state". When the instruction signal CMD2 is received, the state control circuit 107 gives an inactive state control signal S3 to the data transmission circuit 102. In response to the inactive state control signal S3, the data transmission circuit 102 goes into the halt state from the send state.

Furthermore, the restored CPU 105 gives an instruction signal CMD3 to the state control circuit 107. The instruction signal CMD3 is an instruction to "place the nonvolatile memory 106 in the operative state". When the instruction signal CMD3 is received, the state control circuit 107 gives an active state control signal S1. In response to the active state control signal S1, the nonvolatile memory 106 goes into the operative state. The CPU 105 resumes the write processing from the state (the address, the data and the time spent on the processing) stored in the resume circuit 1501. The resume circuit 1501 counts time continuously from the stored time (herein 7 ms).

When the time reaches 10 ms, the CPU 105 gives an instruction signal CMD4 to the state control circuit 107. The instruction signal CMD4 is an instruction to "place the nonvolatile memory 106 in the halt state". When the instruction signal CMD4 is received, the state control circuit 107 gives an inactive state control signal S1 to the nonvolatile memory 106. In response to the inactive state control signal S1, the nonvolatile memory 106 stops its operation.

Also in the case where the CPU 105 issues a receive processing instruction after the write processing is started in the nonvolatile memory 106 and before the time shown by the resume circuit 1501 reaches 10 ms, the processing is carried out in the same manner as described above.

<Flowchart>

Figure 17:
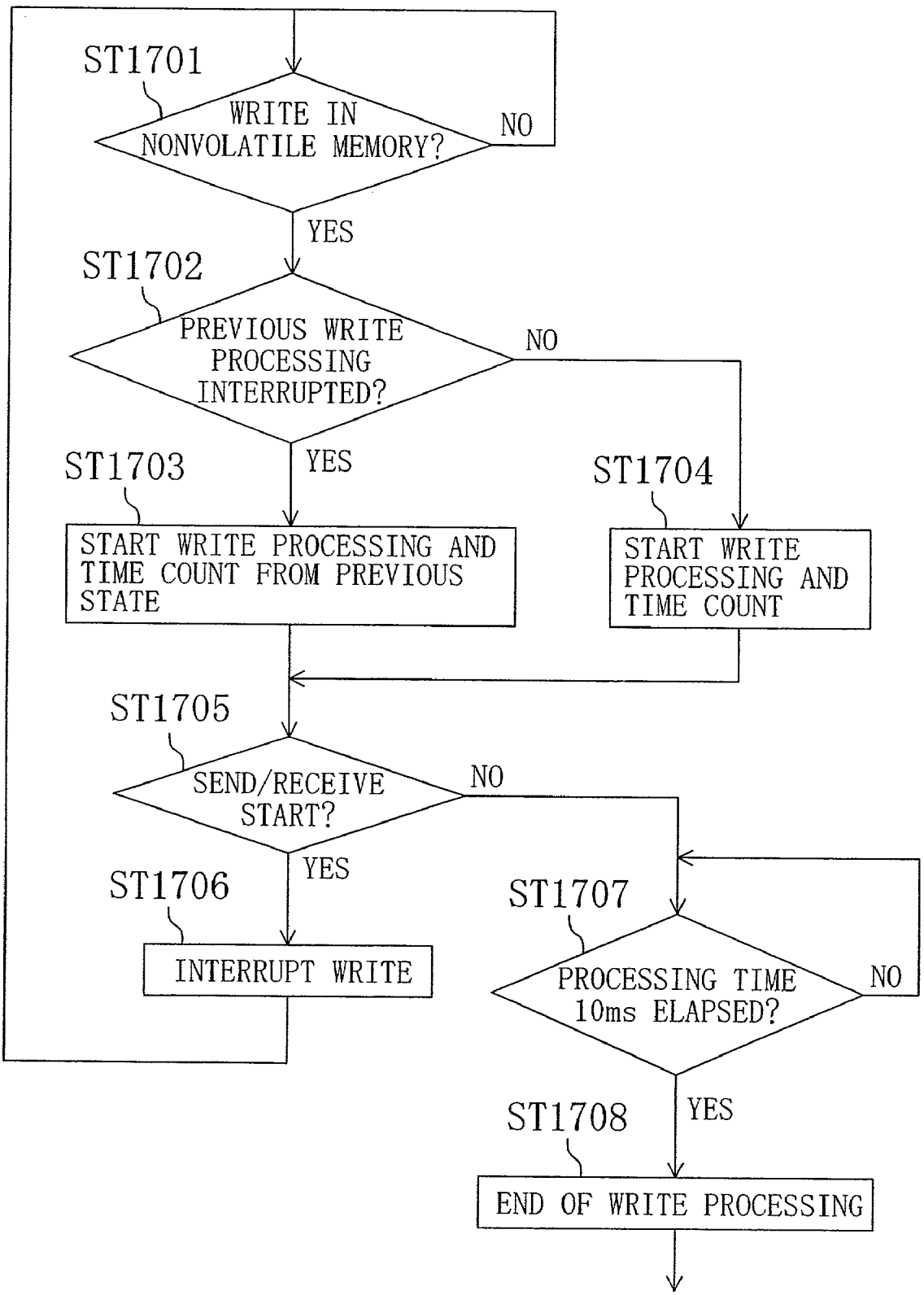
FIG. 17 is a flowchart for showing flow of write processing on a nonvolatile memory in the IC card shown in FIG. 15.

FIG. 17 is a flowchart for showing the flow of the write processing on the nonvolatile memory of the IC card of FIG. 15. The flow of the processing will now be described with reference to FIG. 17.

First, in step ST1701, it is determined whether or not the write processing is to be executed on the nonvolatile memory 106. In the case where the write processing is to be executed, the procedure proceeds to step ST1701.

Next, in step ST1702, it is determined whether or not previous write processing is completely ended. This is determined by referring the time stored in the resume circuit 1501. When the time stored in the resume circuit 1501 does not reach time required for completing the write processing, it is determined that the previous write processing is interrupted, and the procedure proceeds to step ST1703.

In step ST1703, the CPU 105 resumes the write processing from the state (the address, the data and the time spent on the processing) stored in the resume circuit 1501. The resume circuit 1501 counts time continuously from the stored time.

On the other hand, when the time stored in the resume circuit 1501 has reached the time required for completing the write processing in step ST1702, it is determined that the previous write processing has been completely ended, and the procedure proceeds to step ST1704.

In step ST1704, the CPU 105 starts the write operation from the beginning. The resume circuit 1501 starts counting time from the beginning.

Next, in step ST1705, in the case where the send/receive processing is started before the time counted by the resume circuit 1501 reaches the time required for completing the write processing, the procedure proceeds to step ST1706.

In step ST1706, the resume circuit 107 stores a state of the write operation attained at this point, namely, an address and data for the write processing and time spent on the write processing up to this point. Then, the procedure returns to step ST1701.

On the other hand, when the send/receive processing is not started in step ST1705, the procedure proceeds to step ST1707. In step ST1707, it is determined whether or not the time counted by the resume circuit 1501 reaches the time required for completing the write processing, and when it reaches, the procedure proceeds to step ST1708, where the write processing is ended.

In this manner, since the IC card of Embodiment 6 of the invention includes the resume circuit 1501, even when the write processing on the nonvolatile memory 106 is interrupted by a send/receive processing instruction, the write processing can be resumed from the state attained when it was interrupted.

Embodiment 7

Figure 18:
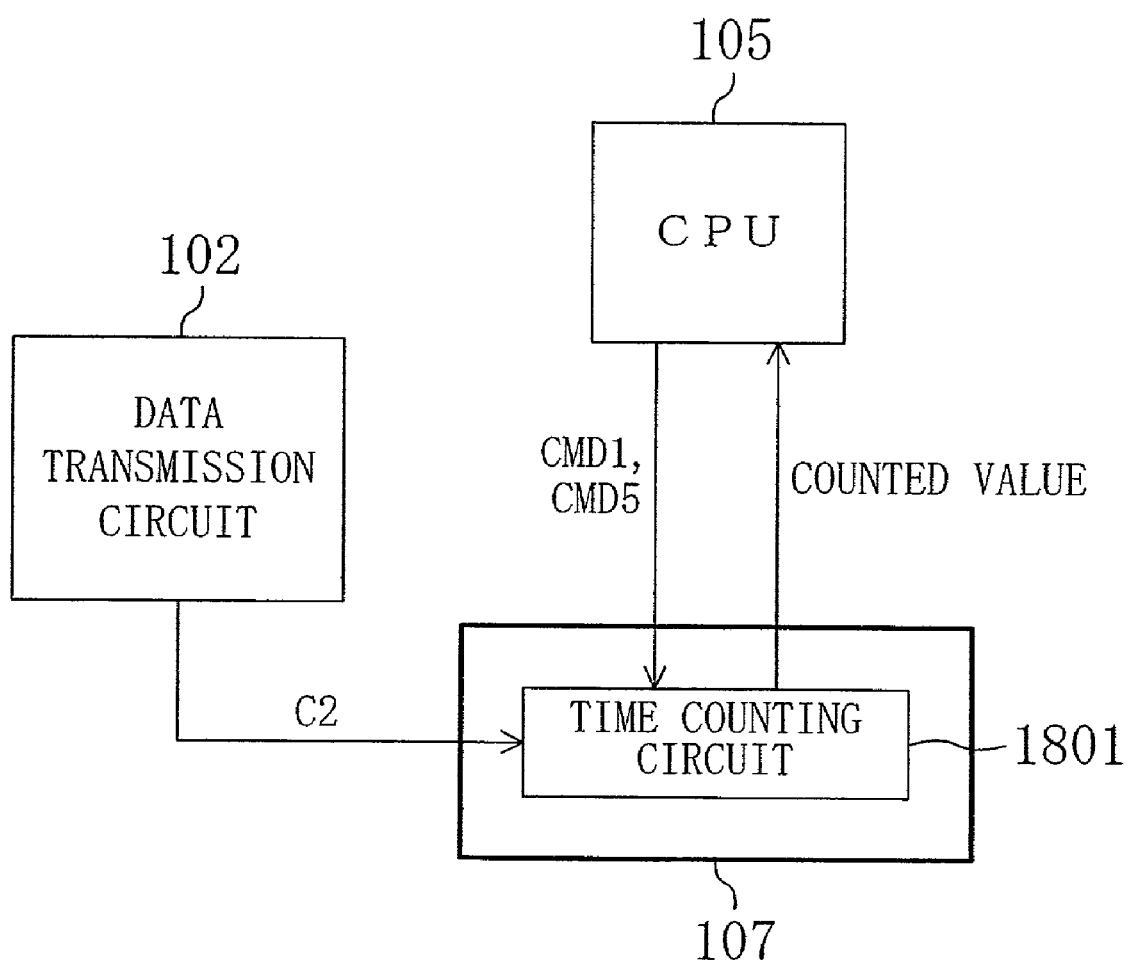
FIG. 18 is a block diagram for showing the configuration of a principal part of an IC card according to Embodiment 7 of the invention.

FIG. 18 is a block diagram for showing the configuration of a principal part of an IC card according to Embodiment 7 of the invention. Referring to FIG. 18, the IC card is characterized by including a time counting circuit 1801 within the state control circuit 107. The rest of the configuration is the same as that of the IC card of FIG. 1.

The time counting circuit 1801 starts counting time in response to instruction signals CMD1 and CMD5 output from the CPU 105. The instruction signal CMD1 is an instruction to "place the data transmission circuit 102 in the receive state". The instruction signal CMD5 is an instruction to "place the data transmission circuit 102 in the send state". The time count is stopped in response to an interruption signal C2 from the data transmission circuit 102, and a counted value is output to the CPU 105.

Next, the operation of the IC card having the aforementioned configuration will be described.

When the CPU 105 gives an instruction signal CMD1 or CMD5 to the state control circuit 107, the time counting circuit 1801 starts counting time. In response to the instruction signal CMD1 or CMD5, the IC card carries out the receive processing or the send processing.

When the receive processing or the send processing is completed, the data transmission circuit 102 gives an interruption signal C2 to the state control circuit 107. The interruption signal C2 is a signal corresponding to a request to "place the CPU 105 in the operative state".

In response to the interruption signal C2, the time counting circuit 1801 stops counting time and outputs a counted value to the CPU 105.

As shown in FIG. 7, the CPU 105 is in the halt state when the data transmission circuit 102 is in the receive or send state. When the CPU 105 restores from the halt state to the operative state, however, it should be informed of time during which it was in the halt state (that is, system time spent on receive processing or system time spent on send processing shown in FIG. 7). In the case where an accessory timer of the CPU 105 is used for being informed of the time during which it was in the halt state, the CPU 105 is operated at predetermined time intervals while the data transmission circuit 102 is in the receive state or in the send state. Noise is caused by this operation of the CPU 105, and the noise can affect the data transmission circuit 102 in the receive state or in the send state.

Since the IC card of FIG. 18 includes the time counting circuit 1801, the CPU 105 can be completely placed in the halt state while the data transmission circuit 102 is in the receive state or in the send state. Accordingly, the CPU 105 can be informed of the time during which it was in the halt state without causing noise by the operation of the CPU 105.

Embodiment 8

Figure 19:
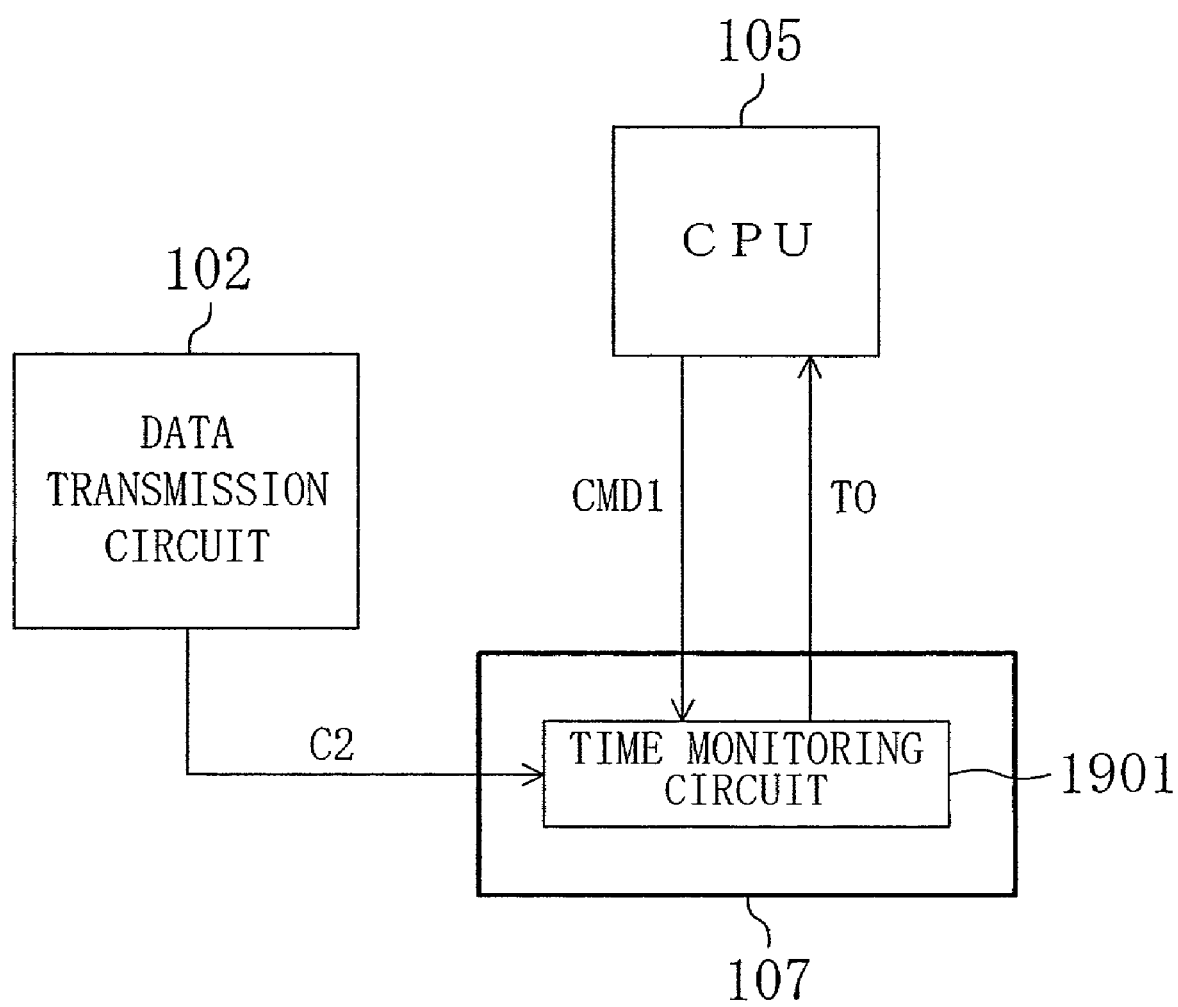
FIG. 19 is a block diagram for showing the configuration of a principal part of an IC card according to Embodiment 8 of the invention.

FIG. 19 is a block diagram for showing the configuration of a principal part of an IC card according to Embodiment 8 of the invention. Referring to FIG. 19, the IC card is characterized by including a time monitoring circuit 1901 within the state control circuit 107. The rest of the configuration is the same as that of the IC card of FIG. 1.

The time monitoring circuit 1901 starts counting time in response to an instruction signal CMD1 from the CPU 105. The instruction signal CMD1 is an instruction to "place the data transmission circuit 102 in the receive state". The time monitoring circuit 1901 stops counting time in response to an interruption signal C2 from the data transmission circuit 102 and resets a counted value. On the other hand, when the counted time value reaches a predetermined value, namely, when an interruption signal C2 is not given to the state control circuit 107 until the counted value reaches a predetermined value, the time monitoring circuit 1901 outputs a timeout signal TO to the CPU 105.

Next, the operation of the IC card having the aforementioned configuration will be described.

When the CPU 105 gives an instruction signal CMD1 to the state control circuit 107, the time monitoring circuit 1901 starts counting time. In response to the instruction signal CMD1, the data transmission circuit 102 goes into the receive state.

When the receive processing is completed, the data transmission circuit 102 gives an interruption signal C2 to the state control circuit 107. The interruption signal C2 is a signal corresponding to a request to "place the CPU 105 in the operative state".

In response to the interruption signal C2, the time monitoring circuit 1901 stops counting time and resets the counted value.

When an interruption signal C2 is not given to the state control circuit 107 until the counted time value of the time monitoring circuit 1901 reaches a predetermined value, the time monitoring circuit 1901 outputs a timeout signal TO to the CPU 105.

In response to the timeout signal TO, the CPU 105 restores to the operative state and carries out timeout processing.

In this manner, since the IC card of Embodiment 9 includes the time monitoring circuit 1901, the CPU 105 can restore from the halt state to the operative state when an interruption signal C2 is not given to the state control circuit 107 until a counted value reaches a predetermined value. Accordingly, the CPU 105 can be prevented from being kept in the halt state, for example, when a receive data cannot be received for a long period of time after the data transmission circuit 102 going into the receive state.

The invention claimed is:

1. A contactless integrated circuit (IC) card tat sends/receives data to/from outside and is supplied with power from the outside in a contactless manner, comprising:
a transmission circuit for sending/receiving data to/from the outside;
a buffer memory;
a direct memory access (DMA) circuit for transmitting data received by said transmission circuit to said buffer memory and transmitting data stored in said buffer memory to said transmission circuit;
a nonvolatile memory;
a central processing unit (CPU) for executing write and read processing on said buffer memory and said nonvolatile memory; and
state control means for halting the write and read processing on said buffer memory and said nonvolatile memory of said CPU while said transmission circuit is sending/receiving data to/from the outside.

2. The IC card of claim 1, wherein a data bit appears every predetermined period in data sent/received by said transmission circuit,
said transmission circuit generates an interruption signal at timing between a period for sending/receiving one data bit and a period for sending/receiving another data bit, and
said DMA circuit executes transmission processing in response to the interruption signal.

3. The IC card of claim 1, wherein a data received by said transmission circuit has a structure in accordance with the standard of ISO/IEC 14443-3, and
said transmission circuit includes:
normal waveform storing means for storing a waveform pattern standardized by ISO/IEC 14443-3;
possible error waveform storing means for storing a waveform pattern including a possible error predicted with respect to a data received by said transmission circuit;
waveform detecting means for detecting a waveform pattern of a data received by said transmission circuit; and
collating means for correcting the data received by said transmission circuit on the basis of said normal waveform pattern when said waveform pattern detected by said waveform detecting means accords with said waveform pattern stored in said normal waveform storing means or said waveform pattern stored in said possible error waveform storing means.

4. The IC card of claim 1, wherein a data received by said transmission circuit has a structure in accordance with the standard of ISO/IEC 14443-3,
said transmission circuit includes an analog circuit part for modulating a data received from the outside into a digital data and outputting said digital data,
said IC card further comprises preset signal generation means for giving said analog circuit part a preset signal that is active during a period other than a period when said transmission circuit is receiving a data, and
said analog circuit part sets an output thereof to a logical high level in response to the active preset signal.

5. The IC card of claim 1,
wherein a data received by said transmission circuit has a structure in accordance with the standard of ISO/IEC 14443-3,
said transmission circuit includes an analog circuit part for modulating a data received from the outside into a digital data and outputting said digital data,
said IC card further comprises hold signal generation means for giving said analog circuit part a hold signal that is active during a period other than a period when said transmission circuit is receiving a data, and
said analog circuit part sets, in response to the active hold signal, an output thereof to a logical high level during a period other than the period when said transmission circuit is receiving a data.

6. The IC card of claim 1, further comprising a resume circuit for storing, when data write processing on said nonvolatile memory executed by said CPU is interrupted, a proceeding state of the write processing up to time of interruption,
wherein said CPU rusumes the write processing on said nonvolatile memory on the basis of said proceeding state stored in said resume circuit.

7. The IC card of claim 1, wherein said state control circuit includes a time counting circuit for starting counting time in response to said CPU going into a halt state, stopping counting the time in response to restoration of said CPU to an operative state and outputting a counted value to said CPU.

8. The IC card of claim 1, further comprising a time monitoring circuit for starting counting time in response to said CPU going into a halt state and outputting a timeout signal to said CPU when said CPU does not restore to an operative state before a counted value reaches a given value,
wherein said CPU goes into the operative state in response to the timeout signal output by said time monitoring circuit.

9. The IC card of claim 1, wherein said state control means operates to halt said nonvolatile memory while said transmission circuit is sending/receiving data to/from the outside.

10. The IC card of claim 1, wherein said DMA circuit transmit data when said CPU is in a halt state.

11. The IC card of claim 1, wherein said state control means is in an operative state when said CPU is in a halt state.

12. The IC card of claim 11, wherein said state control means gives an active state control signal to said CPU whereby the CPU is restored to the operative state from the halt state, when said transmission circuit completes the send/receive operation.

13. The IC card of claim 1, wherein said state control means operates to halt all write and read processing of said CPU while said transmission circuit is sending/receiving data to/from the outside.

14. The IC card of claim 1, wherein said DMA circuit transmits data received by said transmission circuit to said buffer memory and transmitting data stored in said buffer memory to said transmission circuit without using the CPU.

15. The IC card of claim 1, wherein said state control means operates to halt all operation of said nonvolatile memory while said transmission circuit is sending/receiving data to/from the outside.

16. A contactless integrated circuit (IC) card that sends/receives data to/from outside and is supplied with power from the outside in a contactless manner, comprising:
a transmission circuit for sending/receiving data to/from the outside;
a buffer memory;
a direct memory access (DMA) circuit for transmitting data received by said transmission circuit to said buffer memory and transmitting data stored in said buffer memory to said transmission circuit a nonvolatile memory; and a central processing unit (CPU) for executing write and read processing on said buffer memory and said nonvolatile memory, wherein the write and read processing on said buffer memory and said nonvolatile memory of said CPU is in a halt state while said transmission circuit is sending/receiving data to/from the outside.

17. The IC card of claim 16, wherein all write and read processing of said CPU is in a halt state while said transmission circuit is sending/receiving data to/from the outside.

18. The IC card of claim 16, wherein all operation of said nonvolatile memory is in a halt state while said transmission circuit is sending/receiving data to/from the outside.

19. A contactless integrated circuit (IC) card that sends/receives data to/from outside and is supplied with power from the outside in a contactless manner, comprising:

a transmission circuit for sending/receiving data to/from the outside;

a buffer memory;

a direct memory access (DMA) circuit for transmitting data received by said transmission circuit to said buffer memory and transmitting data stored in said buffer memory to said transmission circuit;

a nonvolatile memory;

a central processing unit (CPU) for executing write and read processing on said buffer memory and said nonvolatile memory; and state control means for halting operations of at least one of said nonvolatile memory and said CPU while said transmission circuit is sending/receiving data to/from the outside, wherein a data received by said transmission circuit has a structure in accordance with the standard of ISO/IEC 14443-3, and said transmission circuit includes:

normal waveform storing means for storing a waveform pattern standardized by ISO/IEC 14443-3;

possible error waveform storing means for storing a waveform pattern including a possible error predicted with respect to a data received by said transmission circuit;

waveform detecting means for detecting a waveform pattern of a data received by said transmission circuit; and collating means for correcting the data received by said transmission circuit on the basis of said normal waveform pattern when said waveform pattern detected by said waveform detecting means accords with said waveform pattern stored in said normal waveform storing means or said waveform pattern stored in said possible error waveform storing means.

* * * * *